US006828364B2

(12) United States Patent
Gugumus

(10) Patent No.: US 6,828,364 B2
(45) Date of Patent: Dec. 7, 2004

(54) STABILIZER MIXTURES

(75) Inventor: François Gugumus, Allschwil (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 383 days.

(21) Appl. No.: 09/899,438

(22) Filed: Jul. 5, 2001

(65) Prior Publication Data

US 2002/0077393 A1 Jun. 20, 2002

(30) Foreign Application Priority Data

Jul. 14, 2000 (EP) ............................. 00810621

(51) Int. Cl.⁷ ............................................. C08K 5/34
(52) U.S. Cl. .................... 524/95; 524/100; 524/102; 524/103; 252/183.12; 252/182.13
(58) Field of Search .................. 524/100, 95, 102, 524/103; 252/183.12, 182.13

(56) References Cited

U.S. PATENT DOCUMENTS

| 4,929,652 A | 5/1990 | Gugumus | 524/91 |
|---|---|---|---|
| 4,965,301 A | 10/1990 | Leininger | 524/101 |
| 5,025,051 A | 6/1991 | Sato et al. | 524/99 |
| 5,037,870 A | 8/1991 | Gugumus | 524/102 |
| 5,679,733 A | 10/1997 | Malik et al. | 524/99 |
| 5,919,399 A | 7/1999 | Gugumus | 252/403 |
| 5,977,221 A * | 11/1999 | Gugumus | 524/100 |
| 5,980,783 A | 11/1999 | Gugumus | 252/401 |
| 6,013,703 A | 1/2000 | Kuhn et al. | 524/100 |
| 6,020,406 A | 2/2000 | Gugumus | 524/95 |
| 6,328,912 B1 * | 12/2001 | Gugumus | 252/400.31 |
| 6,365,651 B1 * | 4/2002 | Gugumus | 524/95 |
| 6,368,520 B1 * | 4/2002 | Gugumus | 252/401 |
| 6,512,029 B1 * | 1/2003 | Gugumus | 524/97 |
| 6,545,071 B1 * | 4/2003 | Gugumus | 524/100 |
| 6,566,427 B1 * | 5/2003 | Gugumus | 524/102 |

FOREIGN PATENT DOCUMENTS

| CA | 2169124 | 8/1996 |
|---|---|---|
| DE | 19545896 | 6/1996 |
| EP | 0276923 | 8/1988 |
| EP | 0429731 | 6/1991 |
| EP | 0468923 | 1/1992 |
| EP | 0476612 | 3/1992 |
| EP | 0661341 | 7/1995 |
| EP | 0690094 | 1/1996 |
| EP | 0290388 | 12/1997 |
| EP | 1078929 | 2/2001 |
| GB | 2293827 | 4/1996 |
| GB | 2316409 | 2/1998 |
| GB | 2316410 | 2/1998 |
| GB | 2332677 | 6/1999 |
| GB | 2332678 | 6/1999 |
| GB | 2354245 | 3/2001 |
| WO | 95/25767 | 9/1995 |
| WO | 00/11065 | 3/2000 |
| WO | 01/92393 | 12/2001 |

OTHER PUBLICATIONS

English Abstract for EP1078929 (2001).
Data Sheet of ®Tinuvin 783, Synergistic Mixture of Oligomeric Hindered Amine Stabilizers, Ciba Specialty Chemicals Corp., (1994).
Chem. Abstr. 132:33557 5t for JP 136272 (2000).
2244 Research Disclosure, No. 345, (1993), 34549, pp. 32–34.
Chem. Abstr. 106:197407z for JP 61255953 (1986).
Derwent Abstr. 96–278994/29 for DE 19545896 (1996).
Chem. Abstr. 125:116779q for DE 19545896 (1996).

* cited by examiner

Primary Examiner—Cephia D. Toomer
(74) Attorney, Agent, or Firm—Tyler A. Stevenson

(57) ABSTRACT

A stabilizer mixture containing
  (I) two different sterically hindered amine compounds, and
  (II) at least one compound selected from the group consisting of an organic salt of Zn, an inorganic salt of Zn, Zn oxide, Zn hydroxide, an organic salt of Mg, an inorganic salt of Mg, Mg oxide and Mg hydroxide.

21 Claims, No Drawings

STABILIZER MIXTURES

The present invention relates to a stabilizer mixture containing two different sterically hindered amine compounds and at least one Mg- and/or Zn-compound, the use of this mixture for stabilizing an organic material, in particular a polyolefin, against degradation induced by light, heat or oxidation and the organic material thus stabilized. The stabilization of polyolefins is described in numerous publications, for example in U.S. Pat. Nos. 4,929,652, 5,025,051, 5,037,870, EP-A-276,923, EP-A-290,388, EP-A-429,731, EP-A-468,923, EP-A-661,341, EP-A-690,094, DE-A-19,545,896 (Derwent 96-278,994/29; Chemical Abstracts 125:116779q), WO-A-95/25,767, GB-A-2,293,827, Chemical Abstracts 106:197407z, GB-A-2,332,678, WO-A-00/11,065, GB-A-2,316,409, GB-A-2, 332,677, Chemical Abstracts 132: 335,575t and Research Disclosure 34,549.

In more detail, the present invention relates to a stabilizer mixture containing (I) two different sterically hindered amine compounds, and (II) at least one compound selected from the group consisting of an organic salt of Zn, an inorganic salt of Zn, Zn oxide, Zn hydroxide, an organic salt of Mg, an inorganic salt of Mg, Mg oxide and Mg hydroxide;

with the proviso that component (I) is different from the combination of the compounds (B-8-a) and (B-8-b):

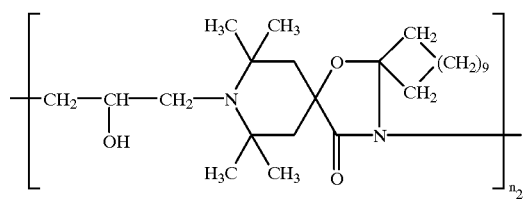

(B-8-a)

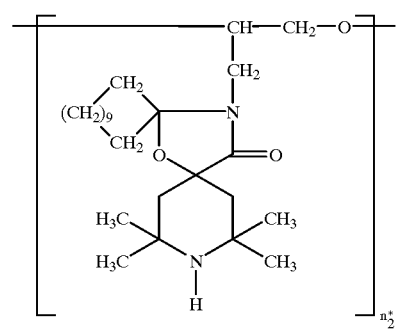

(B-8-b)

wherein $n_2$ and $n_2^*$ are a number from 2 to 50; and with the proviso that, when component (I) is the combination of the compounds (B-1-a-1) and (B-7-a):

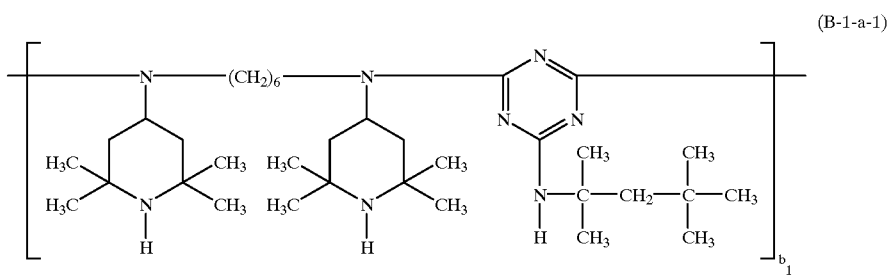

(B-1-a-1)

wherein $b_1$ is a number from 2 to 50,

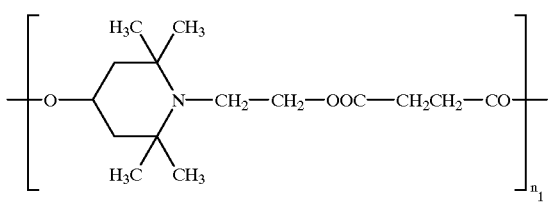

(B-7-a)

wherein $n_1$ is a number from 2 to 50; and, at the same time, component (II) is a Zn carboxylate;

the stabilizer mixture additionally contains as a further component (X-1) a pigment or (X-2) an UV absorber or (X-3) a pigment and an UV absorber.

A preferred embodiment of the present invention relates to a stabilizer mixture containing as component (I) two different sterically hindered amine compounds wherein one sterically hindered amine compound is a compound of the formula (B-1-b) or (B-1-d):

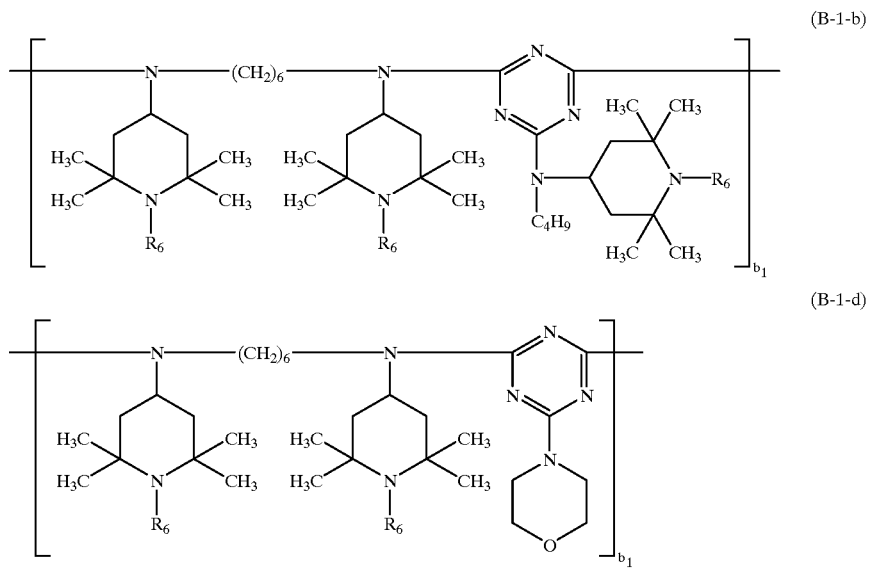

wherein $b_1$ is a number from 2 to 20 and $R_6$ is hydrogen, $C_1$–$C_8$alkyl, $O^-$, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl; and the other sterically hindered amine compound is a compound of the formula (B-7-a)

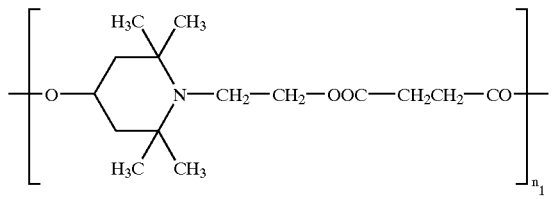

(B-7-a)

wherein $n_1$ is a number from 2 to 20; and component (II) is an organic salt of Zn, an inorganic salt of Zn, Zn oxide or Zn hydroxide; preferably Zn carboxylate.

Preferably, a stabilizer mixture containing a compound of the class (β-1) as defined below, a compound of the class (β-7) as defined below and Zn-carboxylate, in particular an organic salt of Zn, is disclaimed.

According to a preferred embodiment of the present invention, component (II) is an organic salt of Mg, an inorganic salt of Mg, Mg oxide or Mg hydroxide, when component (I) is the combination of a compound of the class (β-1) as defined below, and a compound of the class (β-7) as defined below.

The stabilizer mixtures according to the present invention preferably do not contain a mineral oil.

The two different sterically hindered amine compounds of component (I) are preferably selected from the group consisting of the following classes (α-1) a compound of the formula (A-1):

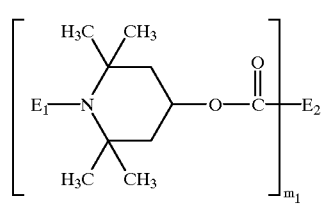

(A-1)

in which $E_1$ is hydrogen, $C_1$–$C_8$alkyl, $O^-$, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, $m_1$ is 1, 2 or 4, if $m_1$ is 1, $E_2$ is $C_1$–$C_{25}$alkyl, if $m_1$ is 2, $E_2$ is $C_1C_{14}$alkylene or a group of the formula (a-I):

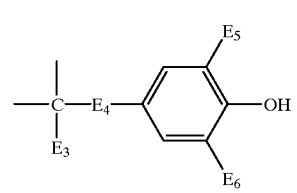

(a-I)

wherein $E_3$ is $C_1$–$C_{10}$alkyl or $C_2$–$C_{10}$alkenyl, $E_4$ is $C_1$–$C_{10}$alkylene, and $E_5$ and $E_6$ independently of one another are $C_1$–$C_4$alkyl, cyclohexyl or methylcyclohexyl, and if $m_1$ is 4, $E_2$ is $C_4$–$C_{10}$alkanetetrayl;

(α-2) a compound of the formula (A-2):

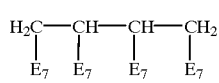
(A-2)

in which two of the radicals $E_7$ are —COO—($C_1$–$C_{20}$alkyl), and
two of the radicals $E_7$ are a group of the formula (a-II):

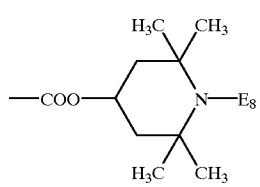
(a-II)

with $E_8$ having one of the meanings of $E_1$;
(α-3) a compound of the formula (A-3):

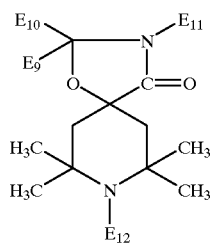
(A-3)

in which $E_9$ and $E_{10}$ together form $C_2$–$C_{14}$alkylene,
$E_{11}$ is hydrogen or a group —$Z_1$—COO—$Z_2$,
$Z_1$ is $C_2$–$C_{14}$alkylene, and
$Z_2$ is $C_1$–$C_{24}$alkyl, and
$E_{12}$ has one of the meanings of $E_1$;
(α-4) a compound of the formula (A-4):

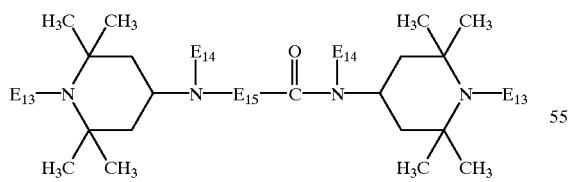
(A-4)

wherein the radicals $E_{13}$ independently of one another have one of the meanings of $E_1$,
the radicals $E_{14}$ independently of one another are hydrogen or $C_1$–$C_{12}$alkyl, and
$E_{15}$ is $C_1$–$C_{10}$alkylene or $C_3$–$C_{10}$alkylidene;

(α-5) a compound of the formula (A-5):

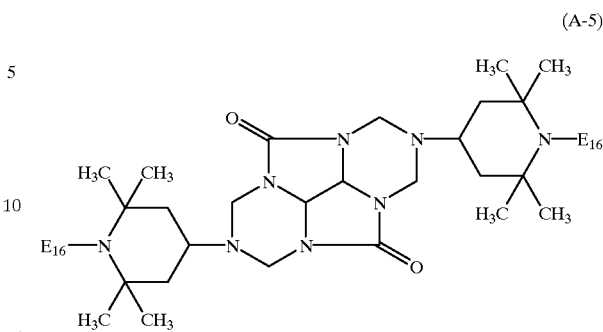
(A-5)

wherein the radicals $E_{16}$ independently of one another have one of the meanings of $E_1$;
(α-6) a compound of the formula (A-6):

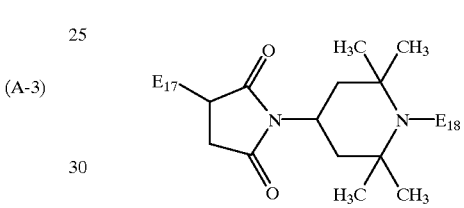
(A-6)

in which $E_{17}$ is $C_1$–$C_{24}$alkyl, and
$E_{18}$ has one of the meanings of $E_1$;
(α-7) a compound of the formula (A-7):

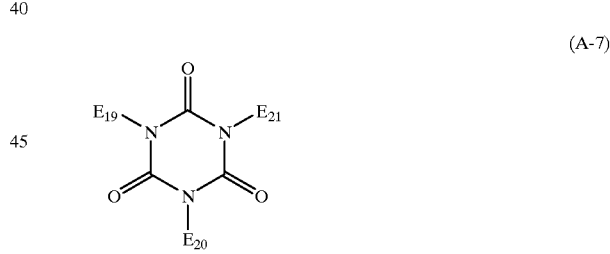
(A-7)

in which $E_{19}$, $E_{20}$ and $E_{21}$ independently of one another are a group of the formula (a-III):

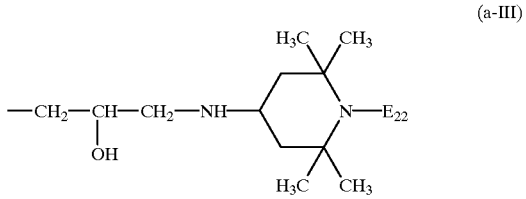
(a-III)

wherein $E_{22}$ has one of the meanings of $E_1$;

(α-8) a compound of the formula (A-8):

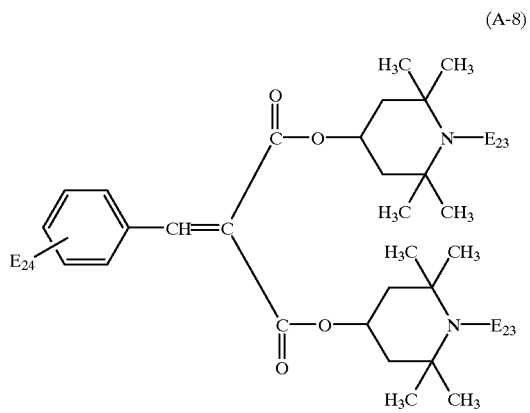

(A-8)

wherein the radicals $E_{23}$ independently of one another have one of the meanings of $E_1$, and $E_{24}$ is hydrogen, $C_1$–$C_{12}$alkyl or $C_1$–$C_{12}$alkoxy;

(α-9) a compound of the formula (A-9):

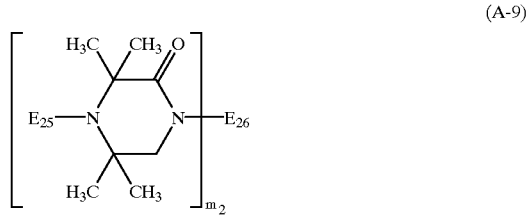

(A-9)

wherein $m_2$ is 1, 2 or 3, $E_{25}$ has one of the meanings of $E_1$, and when $m_2$ is 1, $E_{26}$ is a group

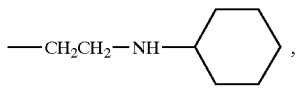

when $m_2$ is 2, $E_{26}$ is $C_2$–$C_{22}$alkylene, and when $m_2$ is 3, $E_{26}$ is a group of the formula (a-IV):

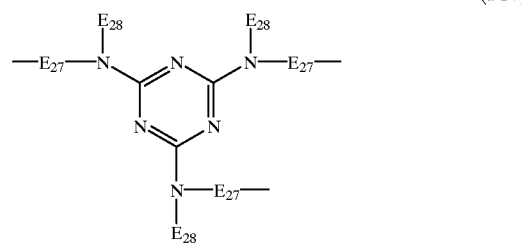

(a-IV)

wherein the radicals $E_{27}$ independently of one another are $C_2$–$C_{12}$alkylene, and the radicals $E_{28}$ independently of one another are $C_1$–$C_{12}$alkyl or $C_5$–$C_{12}$cycloalkyl;

(α-10) a compound of the formula (A-10):

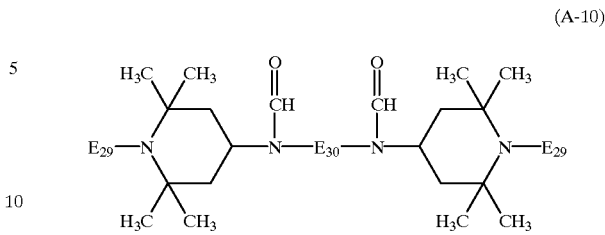

(A-10)

wherein the radicals $E_{29}$ independently of one another have one of the meanings of $E_1$, and $E_{30}$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

(β-1) a compound of the formula (B-1):

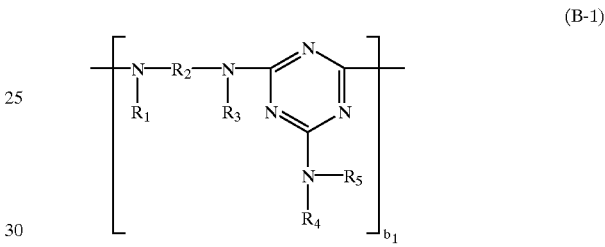

(B-1)

in which $R_1$, $R_3$, $R_4$ and $R_5$ independently of one another are hydrogen, $C_1$–$C_{12}$alkyl, $C_5$–$C_{12}$cycloalkyl, $C_1$–$C_4$-alkyl-substituted $C_5$–$C_{12}$cycloalkyl, phenyl, phenyl which is substituted by —OH and/or $C_1$–$C_{10}$alkyl; $C_7$–$C_9$phenylalkyl, $C_7$–$C_9$phenylalkyl which is substituted on the phenyl radical by —OH and/or $C_1$–$C_{10}$alkyl; or a group of the formula (b-I):

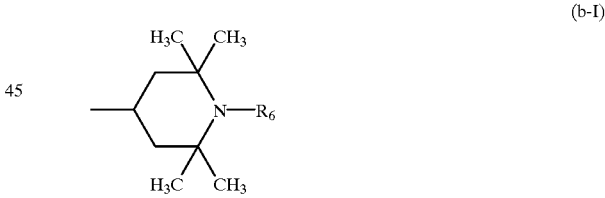

(b-I)

$R_2$ is $C_2$–$C_{18}$alkylene, $C_5$–$C_7$cycloalkylene or $C_1$–$C_4$alkylenedi($B_5$—$C_7$cycloalkylene), or the radicals $R_1$, $R_2$ and $R_3$, together with the nitrogen atoms to which they are bonded, perform a 5- to 10-membered heterocyclic ring, or $R_4$ and $R_5$, together with the nitrogen atom to which they are bonded, form a 5- to 10-membered heterocyclic ring, $R_6$ is hydrogen, $C_1$–$C_8$alkyl, O⁻, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, and $b_1$ is a number from 2 to 50, with the proviso that at least one of the radicals $R_1$, $R_3$, $R_4$ and $R_5$ is a group of the formula (b-I);

(β-2) a compound of the formula (B-2):

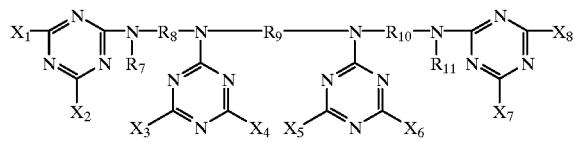

(B-2)

wherein $R_7$ and $R_{11}$ independently of one another are hydrogen or $C_1$–$C_{12}$alkyl, $R_8$, $R_9$ and $R_{10}$ independently of one another are $C_2$–$C_{10}$alkylene, and $X_1$, $X_2$, $X_3$, $X_4$, $X_5$, $X_6$, $X_7$ and $X_8$ independently of one another are a group of the formula (b-II):

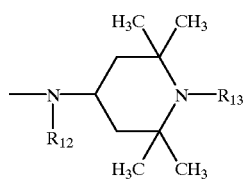

(b-II)

in which $R_{12}$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (b-I) as defined above, and $R_{13}$ has one of the meanings of $R_6$;

(β-3) a compound of the formula (B-3):

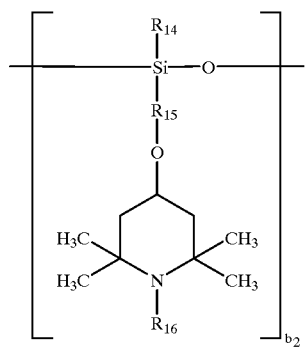

(B-3)

in which $R_{14}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl, $R_{15}$ is $C_3$–$C_{10}$alkylene, $R_{16}$ has one of the meanings of $R_6$, and $b_2$ is a number from 2 to 50;

(β-4) a compound of the formula (B-4):

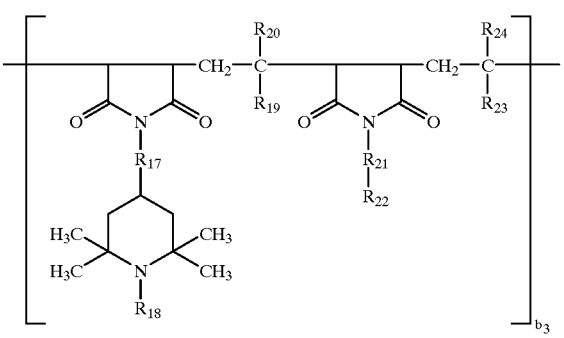

(B-4)

in which $R_{17}$ and $R_{21}$ independently of one another are a direct bond or a —N($X_9$)—CO—$X_{10}$—CO—N($X_{11}$)-group, where $X_9$ and $X_{11}$ independently of one another are hydrogen, $C_1$–$C_8$alkyl, $C_5$–$C_{12}$cycloalkyl, phenyl, $C_7$–$C_9$phenylalkyl or a group of the formula (b-I), $X_{10}$ is a direct bond or $C_1$–$C_4$alkylene, $R_{18}$ has one of the meanings of $R_6$, $R_{19}$, $R_{20}$, $R_{23}$ and $R_{24}$ independently of one another are hydrogen, $C_1$–$C_{30}$alkyl, $C_5$–$C_{12}$cycloalkyl or phenyl, $R_{22}$ is hydrogen, $C_1$–$C_{30}$alkyl, $C_5$–$C_{12}$cycloalkyl, phenyl, $C_7$–$C_9$phenylalkyl or a group of the formula (b-I), and $b_3$ is a number from 1 to 50;

(β-5) a compound of the formula (B-5):

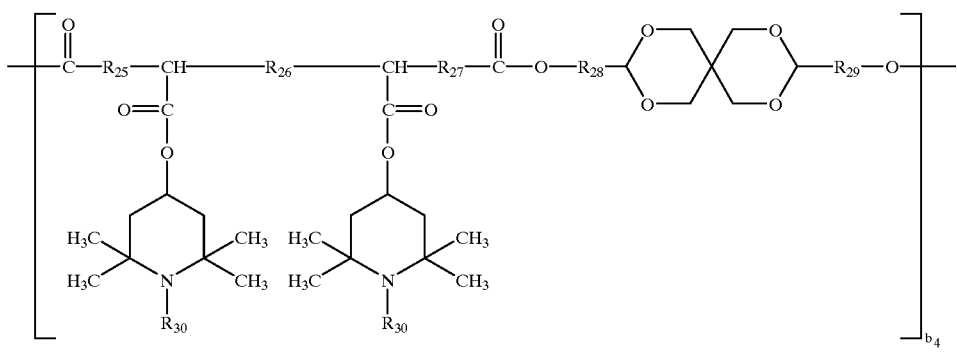

(B-5)

in which
R$_{25}$, R$_{26}$, R$_{27}$, R$_{28}$ and R$_{29}$ independently of one another are a direct bond or C$_1$–C$_{10}$alkylene,
R$_{30}$ has one of the meanings of R$_6$, and
b$_4$ is a number from 1 to 50;

(β-6) a product (B-6) obtainable by reacting a product, obtained by reaction of a polyamine of the formula (B-6-1) with cyanuric chloride, with a compound of the formula (B-6-2):

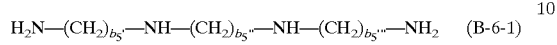
(B-6-1)

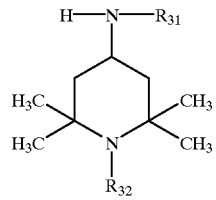
(B-6-2)

in which
b$_5'$, b$_5''$ and b$_5'''$ independently of one another are a number from 2 to 12,
R$_{31}$ is hydrogen, C$_1$–C$_{12}$alkyl, C$_5$–C$_{12}$cycloalkyl, phenyl or C$_7$–C$_9$phenylalkyl, and
R$_{32}$ has one of the meanings of R$_6$;

(β-7) a compound of the formula (B-7):

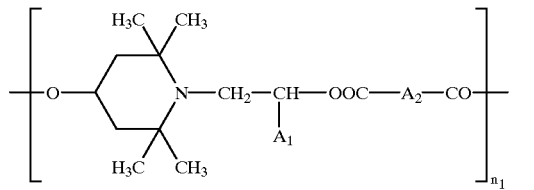
(B-7)

wherein A$_1$ is hydrogen or C$_1$–C$_4$alkyl,
A$_2$ is a direct bond or C$_1$–C$_{10}$alkylene, and
n$_1$ is a number from 2 to 50;

(β-8) at least one compound of the formulae (B-8-a) and (B-8-b):

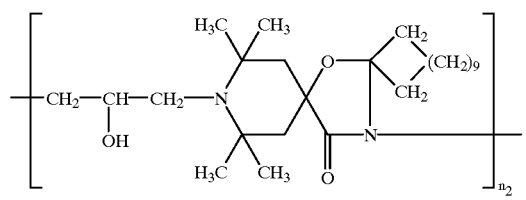
(B-8-a)

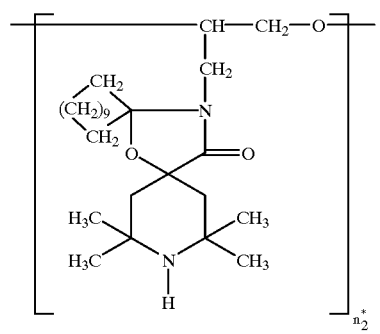
(B-8-b)

wherein n$_2$ and n$_2$* are a number from 2 to 50;

(β-9) a compound of the formula (B-9):

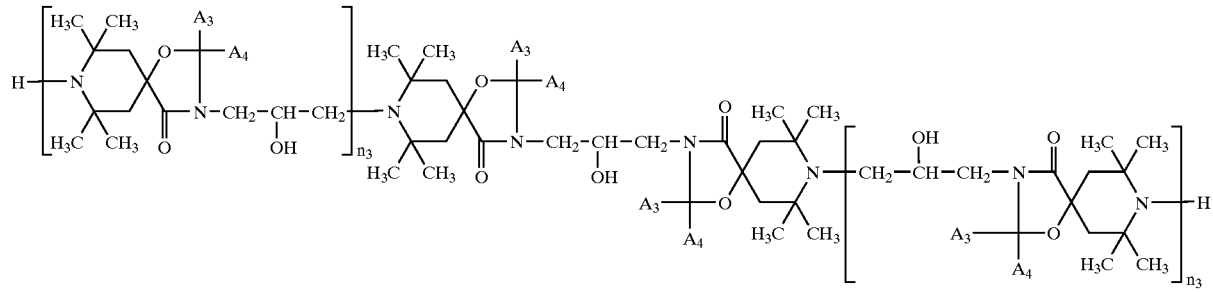
(B-9)

wherein A₃ and A₄ independently of one another are hydrogen or $C_1$–$C_8$alkyl, or A₃ and A₄ together form a $C_2$–$C_{14}$alkylene group, and the variables n₃ independently of one another are a number from 1 to 50; and (β-10) a compound of the formula (B-10):

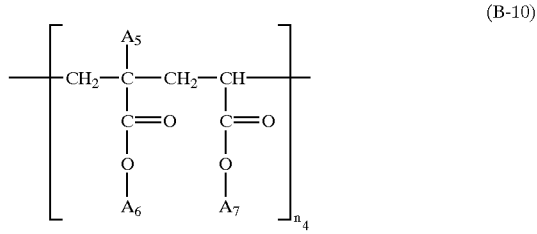

wherein n₄ is a number from 2 to 50,

A₅ is hydrogen or $C_1$–$C_4$alkyl, the radicals A₆ and A₇ independently of one another are $C_1$–$C_4$alkyl or a group of the formula (b-I), with the proviso that at least 50% of the radicals A₇ are a group of the formula (b-I).

Examples of component (I) are:

A compound selected from the class α-1 and a compound selected from the class α-3, α-5, α-6, α-7, α-9, α-10, β-1, β-2, β-3, β-4, β-5, β-6, β-7, β-8 or β-9.

A compound selected from the class α-3 and a compound selected from the class α-5, α-6, α-7, α-9, α-10, β-1, β-2, β-3, β-4, β-5, β-6, β-7, β-8 or β-9.

A compound selected from the class α-5 and a compound selected from the class α-6, α-7, α-9, α-10, β-1, β-2, β-3, β-4, β-5, β-6, β-7, β-8 or β-9.

A compound selected from the class α-6 and a compound selected from the class α-9, α-10, β-1, β-2, β-3, β-4, β-5, β-6, β-7, β-8 or β-9.

A compound selected from the class α-7 and a compound selected from the class α-9, α-10, β-1, β-2, β-3, β-4, β-5, β-6, β-7, β-8 or β-9.

A compound selected from the class α-10 and a compound selected from the class β-1, β-2, β-3, β-4 β-5, β-6, β-7, β-8 or β-9.

A compound selected from the class β-1 and a compound selected from the class β-2, β-3, β-4, β-5, β-6, β-7, β-8, β-9 or β-10.

A compound selected from the class β-2 and a compound selected from the class β-3, β-4, β-5, β-6, β-7, β-8, β-9 or β-10.

A compound selected from the class β-3 and a compound selected from the class β-4, β-5, β-6, β-7, β-8, β-9 or β-10.

A compound selected from the class β-4 and a compound selected from the class β-5, β-6, β-7, β-8, β-9 or β-10.

A compound selected from the class β-5 and a compound selected from the class β-6, β-7, β-8, β-9 or β-10.

A compound selected from the class β-6 and a compound selected from the class β-7, β-8, β-9 or β-10.

A compound selected from the class β-7 and a compound selected from the class β-8, β-9 or β-10.

A compound selected from the class β-8 and a compound selected from the class β-9 or β-10.

A compound selected from the class β-9 and a compound selected from the class β-10.

According to a preferred embodiment, the two different sterically hindered amine compounds of component (I) are selected from the group consisting of the classes (α-1), (α-2), (α-3), (α-4), (α-5), (α-6), (α-7), (α-8), (α-9) and (α-10).

According to a further preferred embodiment, the two different sterically hindered amine compounds of component (I) are selected from the group consisting of the classes (β-1), (β-2), (β-3), (β-4), (β-5), (β-6), (β-7), (β-8), (β-9) and (β-10).

According to another preferred embodiment, one of the two different sterically hindered amine compounds of component (I) is selected from the group consisting of the classes (α-1), (α-2), (α-3), (α-4), (α-5), (α-6), (β-7), (β-8), (α-9) and (α-10), and the other of the two different sterically hindered amine compounds of component (I) is selected from the group consisting of the classes (β-1), (β-2), (β-3), (β-4), (β-5), (β-6), (β-7), (β-8), (β-9) and (β-10).

One of the two different sterically hindered amine compounds of component (I) is preferably selected from the class (β-1).

According to a particularly preferred embodiment, one of the two different sterically hindered amine compounds of component (I) is selected from the class (β-1), and the other of the two different sterically hindered amine compounds of component (I) is selected from the class (α-1) or (β-7).

According to another particularly preferred embodiment, one of the two different sterically hindered amine compounds of component (I) is selected from the class (β-7), and the other of the two different sterically hindered amine compounds of component (I) is selected from the class (β-2).

The two different sterically hindered amine compounds of component (I) are preferably selected from different classes.

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethyl-butyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred definitions of $E_1$, $E_8$, $E_{12}$, $E_{13}$, $E_{16}$, $E_{18}$, $E_{22}$, $E_{23}$, $E_{25}$, $E_{29}$, $R_6$, $R_{13}$, $R_{16}$, $R_{18}$, $R_{30}$ and $R_{32}$ is $C_1$–$C_4$alkyl, especially methyl. $R_{31}$ is preferably butyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy. $E_{24}$ is preferably $C_1$–$C_4$alkoxy and one of the preferred meanings of $R_6$ is propoxy.

Examples of $C_5$–$C_{12}$cycloalkyl are cyclopentyl, cyclohexyl, cycloheptyl, cyclooctyl and cyclododecyl. $C_5$–$C_8$Cycloalkyl, especially cyclohexyl, is preferred.

$C_1$–$C_4$Alkyl-substituted $C_5$–$C_{12}$cycloalkyl is for example methylcyclohexyl or dimethylcyclohexyl.

Examples of $C_5$–$C_{12}$cycloalkoxy are cyclopentoxy, cyclohexoxy, cycloheptoxy, cyclooctoxy, cyclodecyloxy and cyclododecyloxy. $C_5$–$C_8$Cycloalkoxy, in particular cyclopentoxy and cyclohexoxy, is preferred.

—OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$–$C_8$Alkanoyl, $C_3$–$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$–$C_{10}$alkylidene is the group

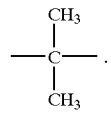

An example of $C_4$–$C_{10}$alkanetetrayl is 1,2,3,4-butanetetrayl.

An example of $C_5$–$C_7$cycloalkylene is cyclohexylene.

An example of $C_1$–$C_4$alkylenedi($C_5$–$C_7$cycloalkylene) is methylenedicyclohexylene.

An example of phenylenedi($C_1$–$C_4$alkylene) is methylene-phenylene-methylene or ethylene-phenylene-ethylene.

Where the radicals $R_1$, $R_2$ and $R_3$, together with the nitrogen atoms to which they are attached, form a 5- to 10-membered heterocyclic ring, this ring is for example:

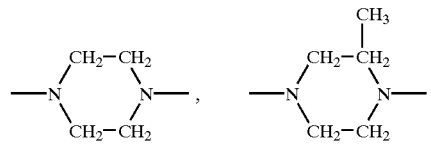

A 6-membered heterocyclic ring is preferred.

Where the radicals $R_4$ and $R_5$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{19}$ and $R_{23}$ is phenyl.

$R_{26}$ is preferably a direct bond.

$n_1$, $n_2$, $n_2$* and $n_4$ are preferably a number from 2 to 25, in particular 2 to 20. $n_3$ is preferably a number from 1 to 25, in particular 1 to 20.

$b_1$ and $b_2$ are preferably a number from 2 to 25, in particular 2 to 20.

$b_3$ and $b_4$ are preferably a number from 1 to 25, in particluar 1 to 20.

$b_5'$ and $b_5'''$ are preferably 3 and $b_5''$ is preferably 2.

The compounds described above as components (I) and (II) are essentially known and commercially available. All of them can be prepared by known processes.

The preparation of the compounds of component (I) is disclosed, for example, in U.S. Pat. Nos. 5,679,733, 3,640,928, 4,198,334, 5,204,473, 4,619,958, 4,110,306, 4,110,334, 4,689,416, 4,408,051, SU-A-768,175 (Derwent 88-138,751/20), U.S. Pat. Nos. 5,049,604, 4,769,457, 4,356,307, 4,619,956, 5,182,390, GB-A-2,269,819, U.S. Pat. Nos. 4,292,240, 5,026,849, 5,071,981, 4,547,538, 4,976,889, 4,086,204, 6,046,304, 4,331,586, 4,108,829, 5,051,458, WO-A-94/12,544 (Derwent 94-177,274/22), DD-A-262,439 (Derwent 89-122,983/17), U.S. Pat. Nos. 4,857,595, 4,529,760, 4,477,615, CAS 136,504-96-6, U.S. Pat. Nos. 4,233,412, 4,340,534, WO-A-98/51,690 and EP-A-1,803.

The product (B-6) can be prepared analogously to known processes, for example by reacting a polyamine of formula (B-6-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol temperature of from –20° C. to +10° C., preferably from –10° C. to +10° C., in particular from 0° C. to +10° C., for from 2 to 8 hours, followed by reaction of the resultant product with a 2,2,6,6-tetramethyl-4-piperidylamine of the formula (B-6-2). The molar ratio of the 2,2,6,6-tetramethyl-4-piperidylamine to polyamine of the formula (B-6-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (B-6-1) to cyanuric chloride to 2,2,6,6-tetramethyl-4-piperidylamine of the formula (B-6-2) is preferebly from 1:3:5 to 1:3:6.

The following example indicates one way of preparing a preferred product (B-6-a).

EXAMPLE 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120–130° C. in vacuo (0.1 mbar). The desired product is obtained as a colourless resin.

In general, the product (B-6) can, for example, be represented by a compound of the formula (B-6-α), (B-6-β) or (B-6-γ). It can also be in the form of a mixture of these three compounds:

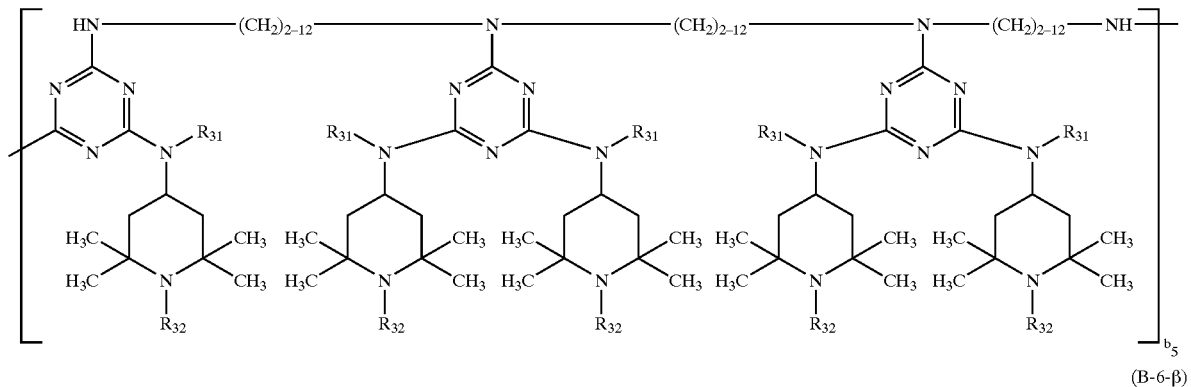
(B-6-α)
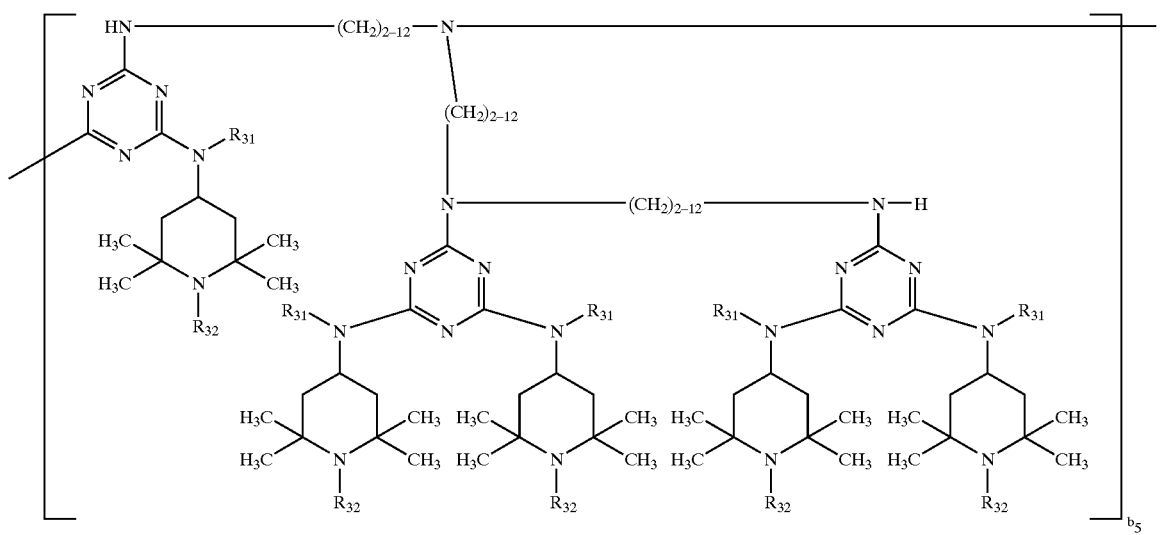
(B-6-β)
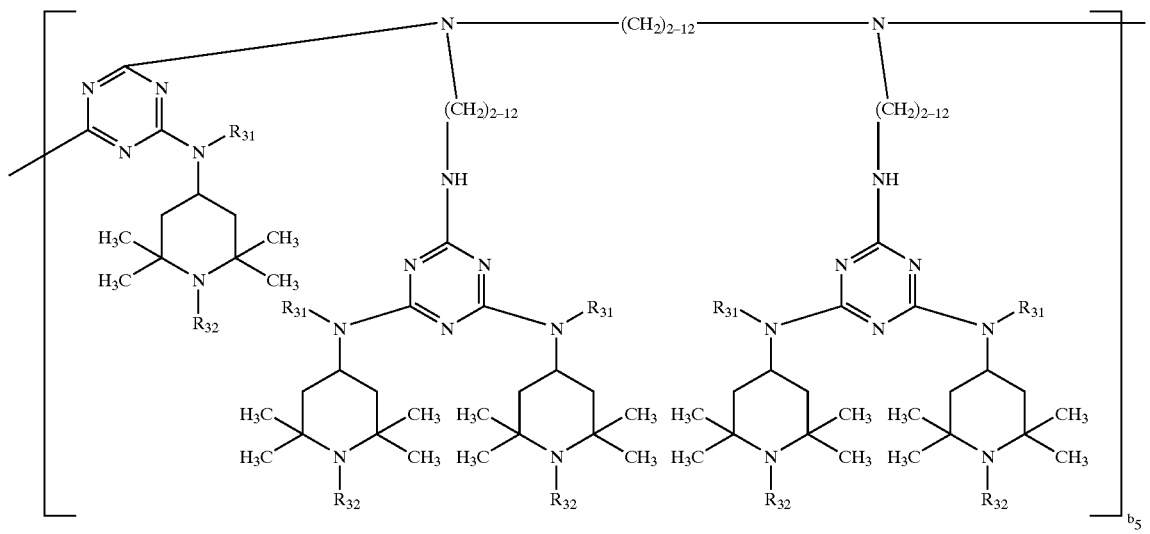
(B-6-γ)

A preferred meaning of the formula (B-6-α) is:
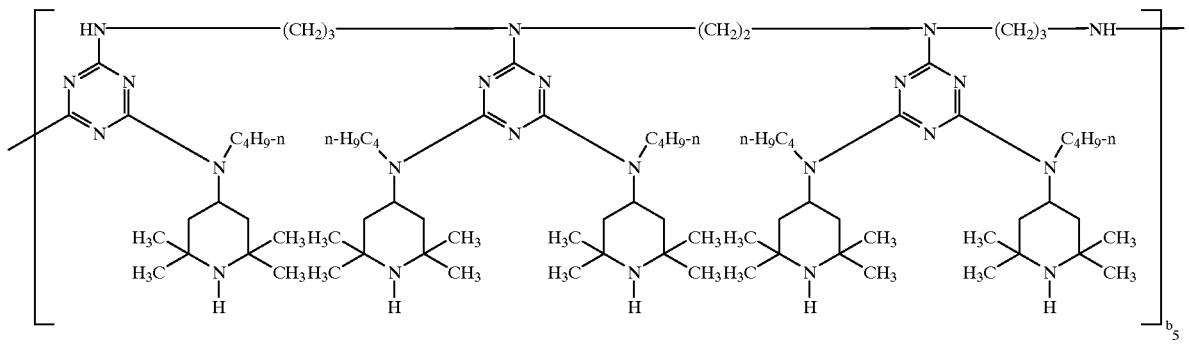
A preferred meaning of the formula (B-6-β) is:
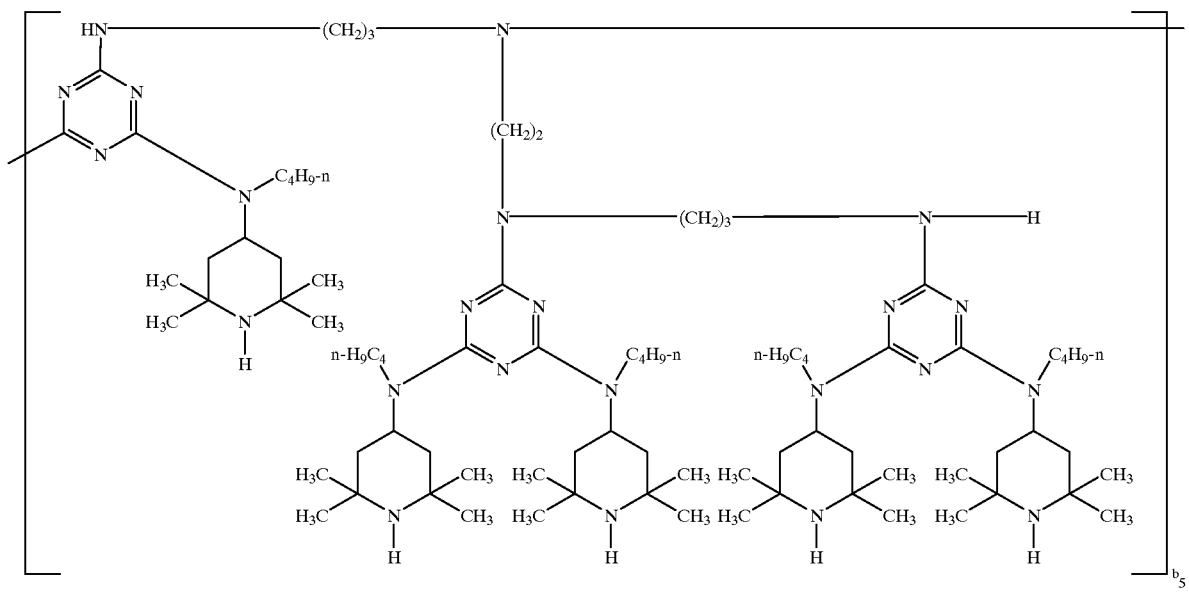
A preferred meaning of the formula (B-6-γ) is:
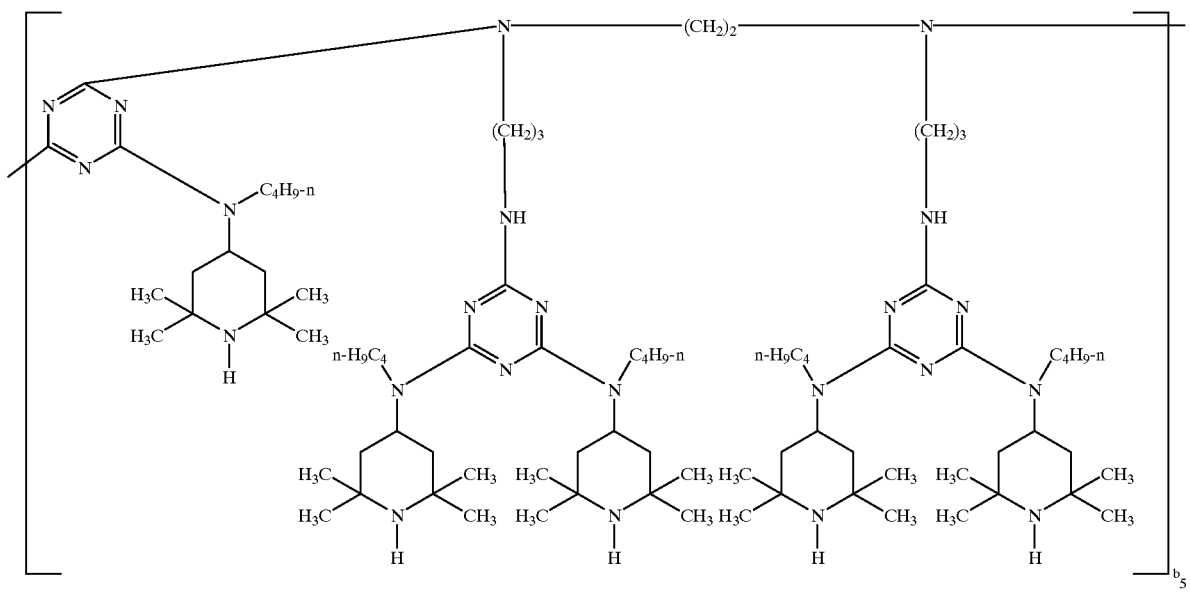

In the above formulae (B-6-α) to (B-6-γ), $b_5$ is preferably 2 to 20, in particular 2 to 10.

The two different sterically hindered amine compounds of component (I) are preferably selected from the group consisting of the following commercial products:

DASTIB 845 (RTM), TINUVIN 770 (RTM), TINUVIN 765 (RTM), TINUVIN 144 (RTM), TINUVIN 123 (RTM), MARK LA 52 (RTM), MARK LA 57 (RTM), MARK LA 62 (RTM), MARK LA 67 (RTM), HOSTAVIN N 20 (RTM), HOSTAVIN N 24 (RTM), SANDUVOR 3050 (RTM), DIACETAM 5 (RTM), SUMISORB TM 61 (RTM), UVINUL 4049 (RTM), SANDUVOR PR 31 (RTM), GOODRITE UV 3034 (RTM), GOODRITE UV 3150 (RTM), GOODRITE UV 3159 (RTM), GOODRITE 3110 x 128 (RTM), UVINUL 4050 H (RTM), CHIMASSORB 944 (RTM), CHIMASSORB 2020 (RTM), CYASORB UV 3346 (RTM), CYASORB UV 3529 (RTM), DASTIB 1082 (RTM), CHIMASSORB 119 (RTM), UVASIL 299 (RTM), UVASIL 125 (RTM), UVASIL 2000 (RTM), UVINUL 5050 H (RTM), LICHTSCHUTZSTOFF UV 31 (RTM), LUCHEM HA B 18 (RTM), MARK LA 63 (RTM), MARK LA 68 (RTM), UVASORB HA 88 (RTM), TINUVIN 622 (RTM), HOSTAVIN N 30 (RTM) and FERRO AM 806 (RTM).

The meanings of the terminal groups which saturate the free valences in the compounds of the formulae (B-1), (B-3), (B-4), (B-5), (B-6-α), (B-6-γ), (B-6-γ), (B-7), (B-8-b) and (B-10) depend on the processes used for their preparation. The terminal groups can also be modified after the preparation of the compounds.

If the compounds of the formula (B-1) are prepared by reacting a compound of the formula:

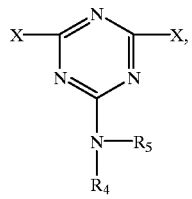

in which X is, for example, halogen, in particular chlorine, and $R_4$ and $R_5$ are as defined above, with a compound of the formula:

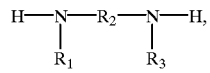

in which $R_1$, $R_2$ and $R_3$ are as defined above, the terminal group bonded to the diamino radical is hydrogen or:

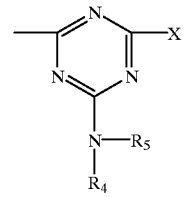

and the terminal group bonded to the triazine radical is X or

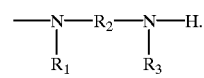

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$–C$_8$alkyl)$_2$ and —NR(C$_1$–C$_8$alkyl), in which R is hydrogen or a group of the formula (b-I).

The compounds of the formula (B-1) also cover compounds of the formula:

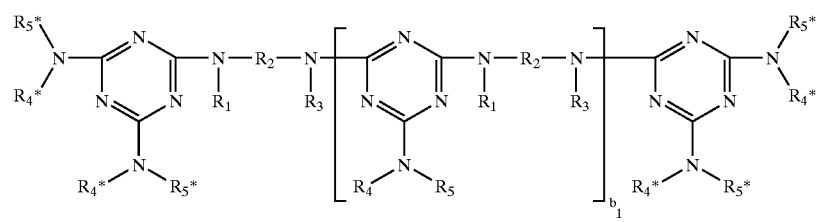

wherein $R_1$, $R_2$, $R_3$, $R_4$, $R_5$ and $b_1$ are as defined above and $R_4^*$ has one of the meanings of $R_4$ and $R_5^*$ has one of the meanings of $R_5$.

One of the particularly preferred compounds of the formula (B-1) is:

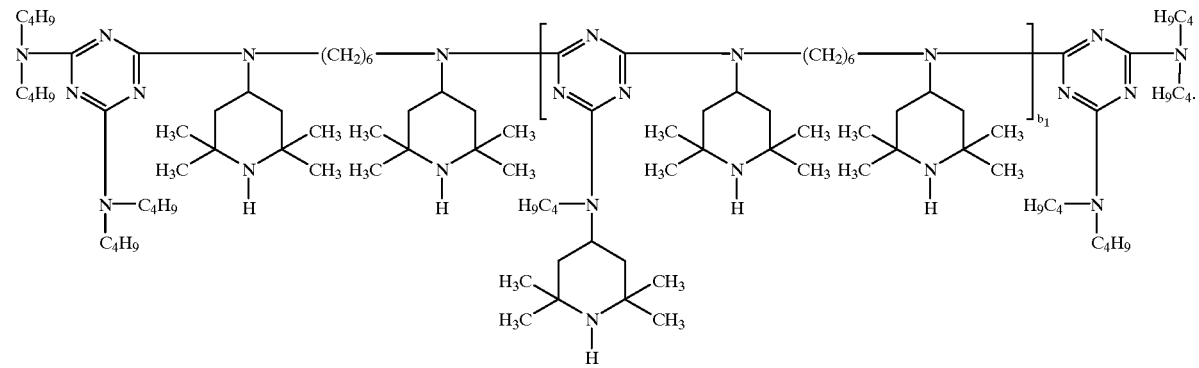

The preparation of this compound is described in Example 10 of U.S. Pat. No. 6,046,304.

In the compounds of the formula (B-3), the terminal group bonded to the silicon atom can be, for example, $(R_{14})_3Si$—O—, and the terminal group bonded to the oxygen can be, for example, —$Si(R_{14})_3$.

The compounds of the formula (B-3) can also be in the form of cyclic compounds if $b_2$ is a number from 3 to 10, i.e. the free valences shown in the structural formula then form a direct bond.

In the compounds of the formula (B-4), the terminal group bonded to the 2,5-dioxopyrrolidine ring is, for example, hydrogen, and the terminal group bonded to the —$C(R_{23})(R_{24})$— radical is, for example,

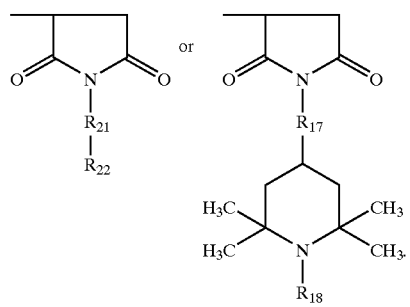

In the compounds of the formula (B-5), the terminal group bonded to the carbonyl radical is, for example,

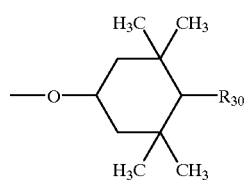

and the terminal group bonded to the oxygen radical is, for example,

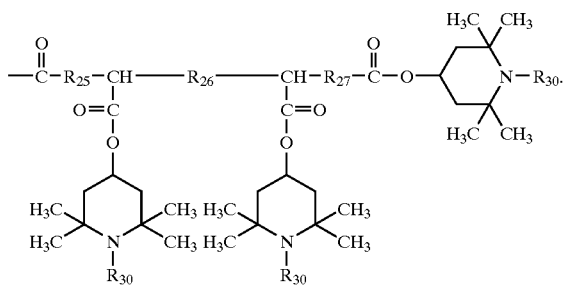

In the compounds of the formulae (B-6-α), (B-6-β) and (B-6-γ), the terminal group bonded to the triazine radical is, for example, Cl or a

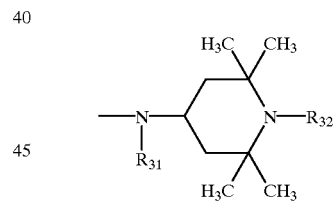

group, and the terminal group bonded to the amino radical is, for example, hydrogen or a

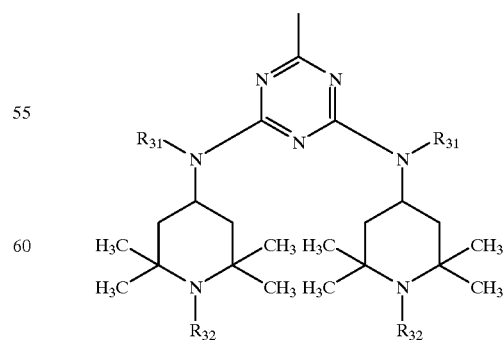

group.

If the compounds of the formula (B-7) are prepared, for example, by reacting a compound of the formula:

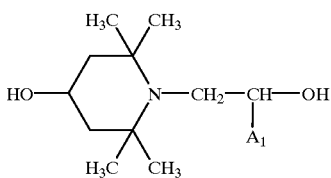

in which $A_1$ is hydrogen or methyl, with a dicarboxylic acid diester of the formula Y—OOC—$A_2$—COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO—$A_2$—COO—Y, and the terminal group bonded to the diacyl radical is —O—Y or

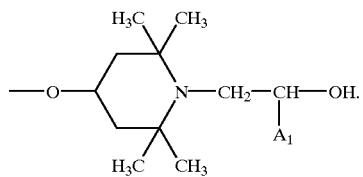

In the compounds of the formula (B-8-a), the terminal group bonded to the nitrogen can be, for example, hydrogen and the terminal group bonded to the 2-hydroxypropylene radical can be, for example, a

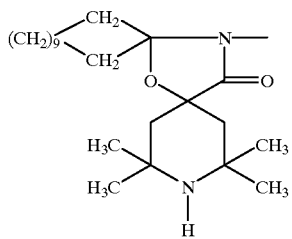

group.

In the compounds of the formula (B-8-b), the terminal group bonded to the dimethylene radical can be, for example, —OH, and the terminal group bonded to the oxygen can be, for example, hydrogen. The terminal groups can also be polyether radicals.

In the compounds of the formula (B-10), the end group bonded to the —$CH_2$— residue can be, for for example, hydrogen and the end group bonded to the —$CH(CO_2A_7)$ residue can be, example, —CH=CH—$COOA_7$.

$E_1$, $E_8$, $E_{12}$, $E_{13}$, $E_{16}$, $E_{18}$, $E_{22}$, $E_{23}$, $E_{25}$, $E_{29}$, $R_6$, $R_{13}$, $R_{16}$, $R_{18}$, $R_{30}$ and $R_{32}$ are preferably hydrogen, $C_1$–$C_4$alkyl, $C_1$–$C_{10}$alkoxy, cyclohexyloxy, allyl, benzyl or acetyl.

$E_1$, $E_8$, $E_{12}$, $E_{13}$, $E_{16}$, $E_{18}$, $E_{22}$, $E_{23}$, $E_{25}$, $E_{29}$, $R_6$, $R_{13}$, $R_{16}$, $R_{18}$, $R_{30}$ and $R_{32}$ are in particular hydrogen or methyl and $E_1$ and $R_6$ additionally are $C_1$–$C_8$alkoxy.

According to a preferred embodiment, $m_1$ is 1, 2 or 4, if $m_1$ is 1, $E_2$ is $C_{12}$–$C_{20}$alkyl, if $m_1$ is 2, $E_2$ is $C_2$–$C_{10}$alkylene or a group of the formula (a-I)

$E_3$ is $C_1$–$C_4$alkyl, $E_4$ is $C_1$–$C_6$alkylene, and $E_5$ and $E_6$ independently of one another are $C_1$–$C_4$alkyl, and if $m_1$ is 4, $E_2$ is $C_4$–$C_8$alkanetetrayl;

two of the radicals $E_7$ are —COO—($C_{10}$–$C_{15}$alkyl), and two of the radicals $E_7$ are a group of the formula (a-II);

$E_9$ and $E_{10}$ together form $C_9$–$C_{13}$alkylene, $E_{11}$ is hydrogen or a group —$Z_1$—COO—$Z_2$, $Z_1$ is $C_2$–$C_6$alkylene, and $Z_2$ is $C_{10}$–$C_{16}$alkyl;

$E_{14}$ is hydrogen, and $E_{15}$ is $C_2$–$C_6$alkylene or $C_3$–$C_5$alkylidene;

$E_{17}$ is $C_{10}$–$C_{14}$alkyl;

$E_{24}$ is $C_1$–$C_4$alkoxy;

$m_2$ is 1, 2 or 3, when $m_2$ is 1, $E_{26}$ is a group

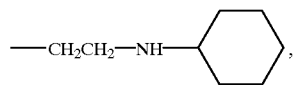

when $m_2$ is 2, $E_{26}$ is $C_2$–$C_6$alkylene, and when $m_2$ is 3, $E_{26}$ is a group of the formula (a-IV)

the radicals $E_{27}$ independently of one another are $C_2$–$C_6$alkylene, and the radicals $E_{28}$ independently of one another are $C_1$–$C_4$alkyl or $C_5$–$C_8$cycloalkyl; and $E_{30}$ is $C_2$–$C_8$alkylene;

$R_1$ and $R_3$ independently of one another are a group of the formula (b-I), $R_2$ is $C_2$–$C_8$alkylene, $R_4$ and $R_5$ independently of one another are hydrogen, $C_1$–$C_{12}$alkyl, $C_5$–$C_8$cycloalkyl or a group of the formula (b-I), or the radicals $R_4$ and $R_5$, together with the nitrogen atom to which they are bonded, form a 5- to 10-membered heterocyclic ring, and $b_1$ is a number from 2 to 25;

$R_7$ and $R_{11}$ independently of one another are hydrogen or $C_1$–$C_4$alkyl, $R_8$, $R_9$ and $R_{10}$ independently of one another are $C_2$–$C_4$alkylene, and $X_1$, $X_2$, $X_3$, $X_4$, $X_5$, $X_6$, $X_7$ and $X_8$ independently of one another are a group of the formula (b-II), $R_{12}$ is hydrogen, $C_1$–$C_4$alkyl, $C_5$–$C_8$cycloalkyl or a group of the formula (b-I);

$R_{14}$ is $C_1$–$C_4$alkyl, $R_{15}$ is $C_3$–$C_6$alkylene, and $b_2$ is a number from 2 to 25;

$R_{17}$ and $R_{21}$ independently of one another are a direct bond or a group —N($X_9$)—CO—$X_{10}$—CO—N ($X_{11}$)—, $X_9$ and $X_{11}$, independently of one another are hydrogen or $C_1$–$C_4$alkyl, $X_{10}$ is a direct bond, $R_{19}$ and $R_{23}$ are $C_1$–$C_{25}$alkyl or phenyl, $R_{20}$ and $R_{24}$ are hydrogen or $C_1$–$C_4$alkyl, $R_{22}$ is $C_1$–$C_{25}$alkyl or a group of the formula (b-I), and $b_3$ is a number from 1 to 25;

$R_{25}$, $R_{26}$, $R_{27}$, $R_{28}$ and $R_{29}$ independently of one another are a direct bond or $C_1$–$C_4$alkylene, and $b_4$ is a number from 1 to 25;

$b_5'$, $b_5''$ and $b_5'''$ independently of one another are a number from 2 to 4, and $R_{31}$ is hydrogen, $C_1$–$C_4$alkyl, $C_5$–$C_8$cycloalkyl, phenyl or benzyl;

$A_1$ is hydrogen or methyl, $A_2$ is a direct bond or $C_2$–$C_6$alkylene, and $n_1$ is a number from 2 to 25;

$n_2$ and $n_2^*$ are a number from 2 to 25;

$A_3$ and $A_4$ independently of one another are hydrogen or $C_1$–$C_4$alkyl, or $A_3$ and $A_4$ together form a $C_9$–$C_{13}$alkylene group, and the variables $n_3$ independently of one another are a number from 1 to 25;

$n_4$ is a number from 2 to 25, $A_5$ and $A_6$ independently of one another are $C_1$–$C_4$alkyl, and $A_7$ is $C_1$–$C_4$alkyl or a group of the formula (b-I) with the proviso that at least 50% of the radicals $A_7$ are a group of the formula (b-I).

The two different sterically hindered amine compounds of component (I) are preferably selected from the group consisting of the compounds of the formulae (A-1-a), (A-1-b), (A-1-c), (A-1-d), (A-2-a), (A-3-a), (A-3-b), (A-4-a), (A-4-b), (A-5), (A-6-a), (A-7), (A-8-a), (A-9-a), (A-9-b), (A-9-c), (A-10-a), (B-1-a), (B-1-b), (B-1-c), (B-1-d), (B-2-a), (B-3-a), (A-4-a), (B-4-b) and (B-4-c), a product (B-6-a) and the compounds of the formulae (B-7-a), (B-8-a), (B-8-b), (B-9-a) and (B-10-a);

wherein $E_1$ is hydrogen, $C_1$–$C_8$alkyl, $O^-$, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl;

(A-2-a)

in which two of the radicals $E_7$ are —COO—$C_{13}H_{27}$ and two of the radicals $E_7$ are

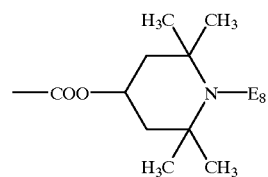

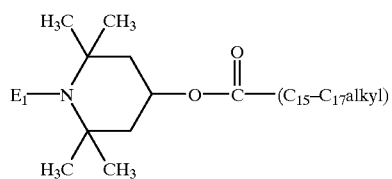
(A-1-a)

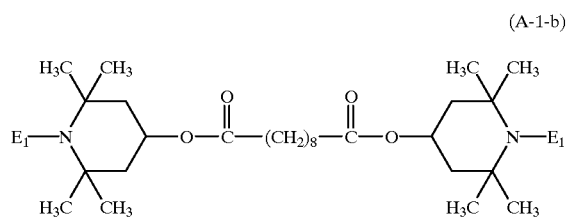
(A-1-b)

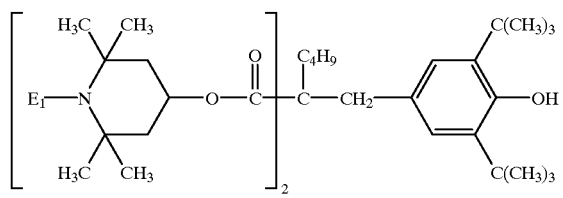
(A-1-c)

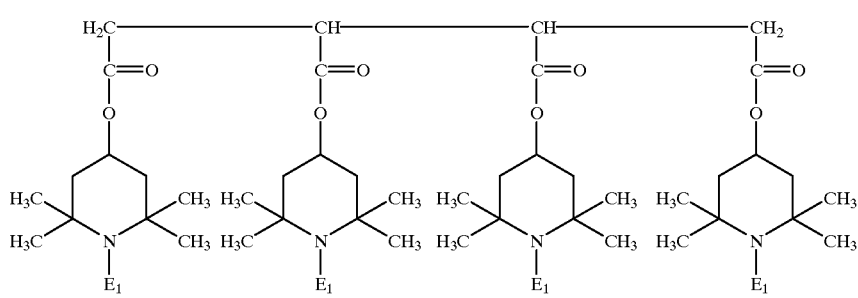
(A-1-d)

and $E_8$ has one of the meanings of $E_1$;
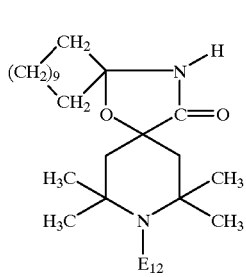
(A-3-a)
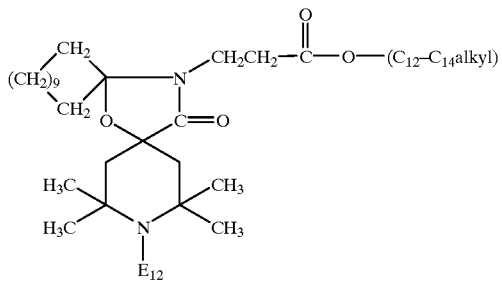
(A-3-b)
wherein $E_{12}$ has one of the meanings of $E_1$;
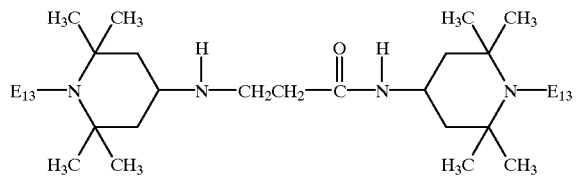
(A-4-a)
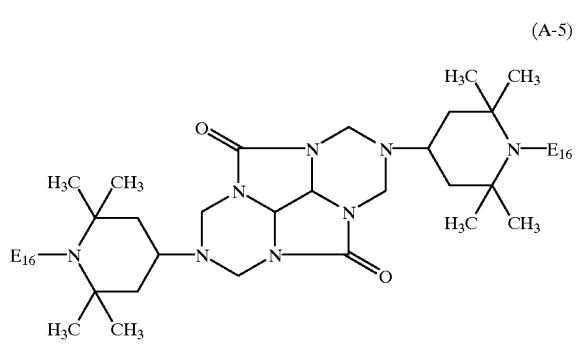
(A-4-b)
wherein $E_{13}$ has one of the meanings of $E_1$;
(A-5)
wherein $E_{16}$ has one of the meanings of $E_1$;
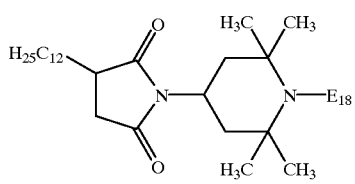
(A-6-a)
wherein $E_{18}$ has one of the meanings of $E_1$;
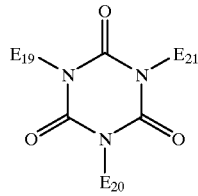
(A-7)
in which $E_{19}$, $E_{20}$ and $E_{21}$ independently of one another are a group of the formula (a-III)
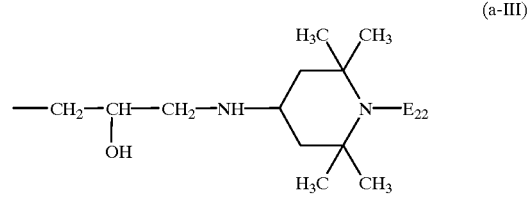
(a-III)
wherein $E_{22}$ has one of the meanings of $E_1$;
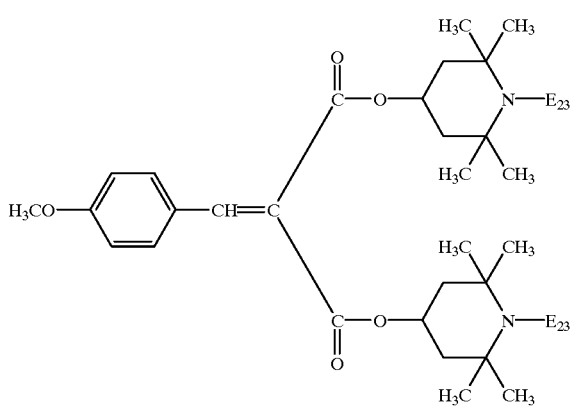
(A-8-a)

wherein $E_{23}$ has one of the meanings of $E_1$;
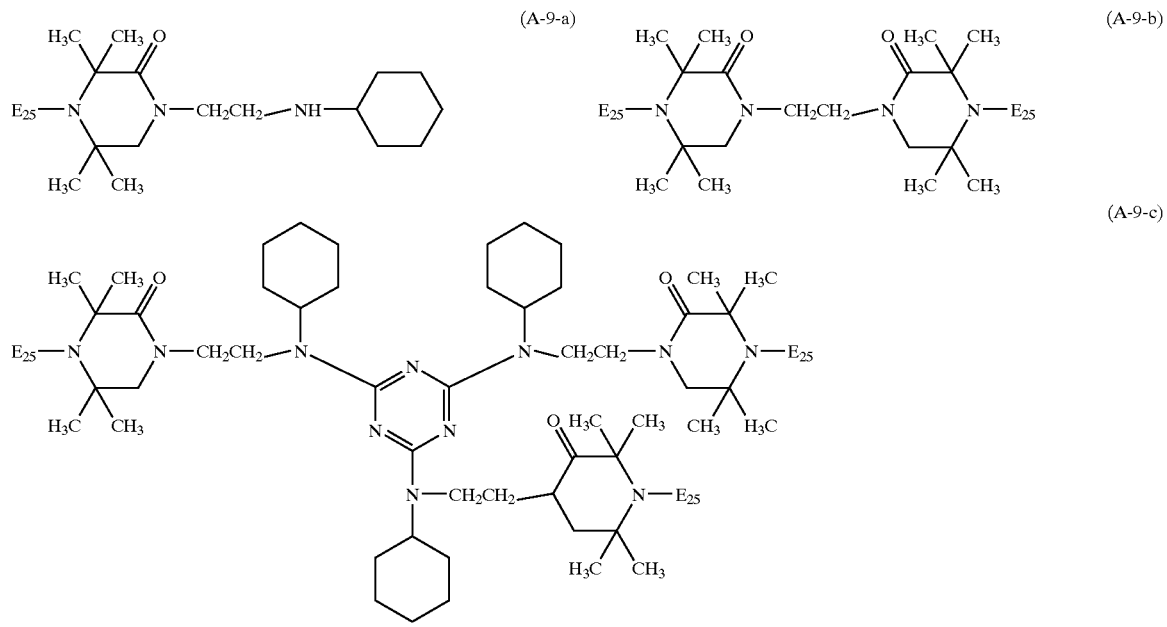
(A-9-a) (A-9-b) (A-9-c)
wherein $E_{25}$ has one of the meanings of $E_1$;
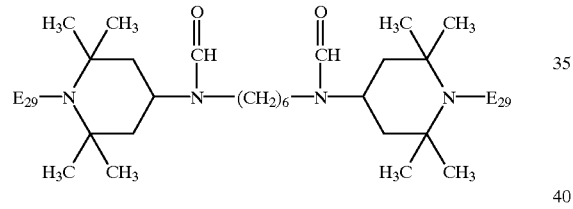
(A-10-a)
wherein $E_{29}$ has one of the meanings of $E_1$;
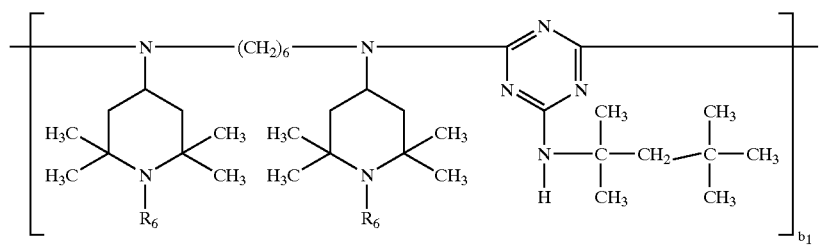
(B-1-a)
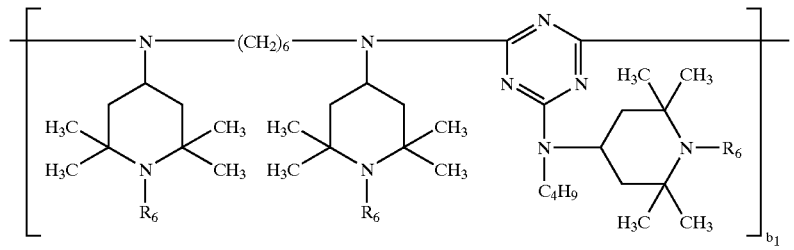
(B-1-b)

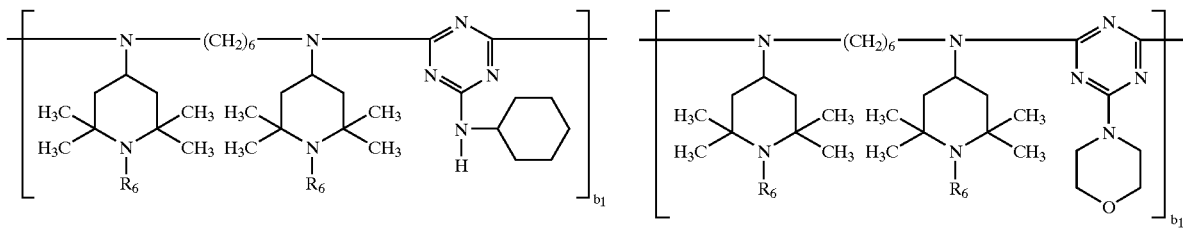
wherein $b_1$ is a number from 2 to 20 and $R_6$ is hydrogen, $C_1$–$C_8$alkyl, $O^-$, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl;
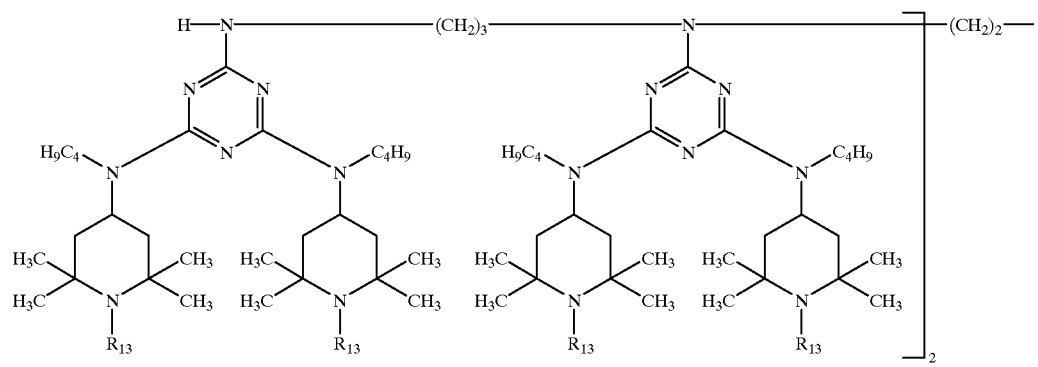
wherein $R_{13}$ has one of the meanings of $R_6$,
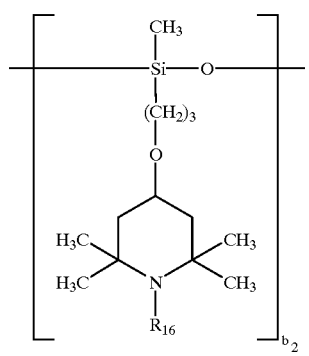
wherein $b_2$ is a number from 2 to 20 and $R_{16}$ has one of the meanings of $R_6$;
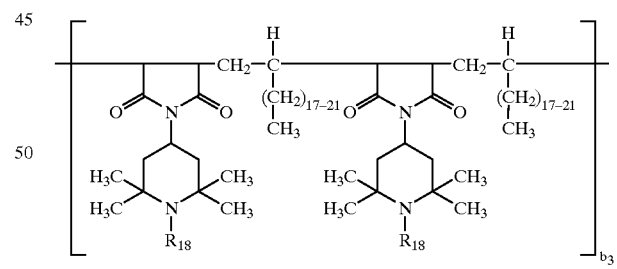
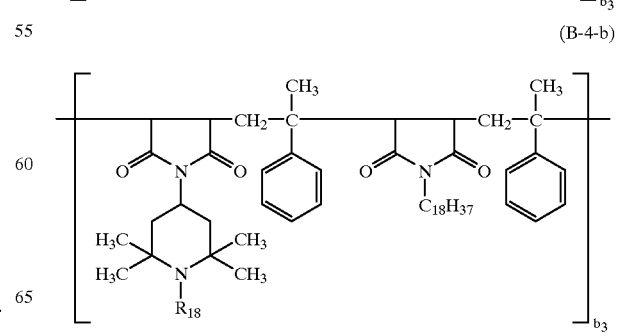

-continued (B-4-c)

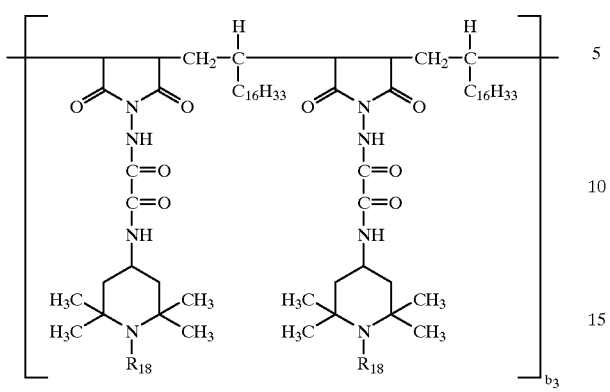

wherein $b_3$ is a number from 1 to 20 and $R_{18}$ has one of the meanings of $R_6$;

in which $R_{32}$ has one of the meanings of $R_6$;

(B-7-a)

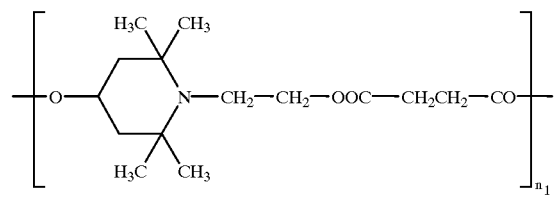

wherein $n_1$ is a number from 2 to 20;

(B-8-a)

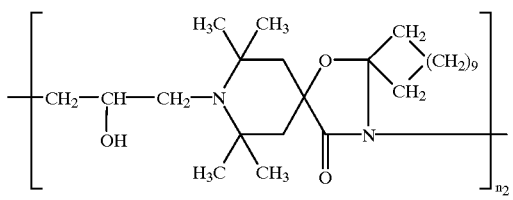

(B-5-a)

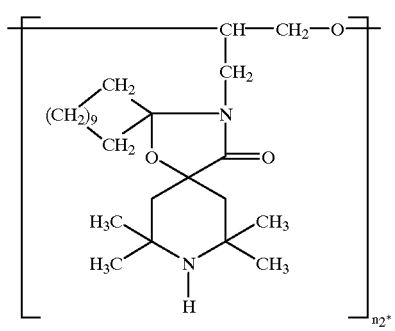

wherein $b_4$ is a number from 1 to 20 and $R_{30}$ has one of the meanings of $R_6$;

a product (B-6-a) obtainable by reacting a product, obtained by reaction of a polyamine of the formula (B-6-1-a) with cyanuric chloride, with a compound of the formula (B-6-2-a):

(B-6-1-a)

—H$_2$N—(CH$_2$)$_3$—NH—(CH$_2$)$_2$—NH—(CH$_2$)$_3$—NH$_2$ (B-6-2-a)

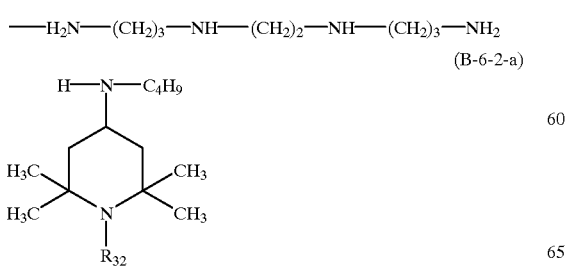

-continued (B-8-b)

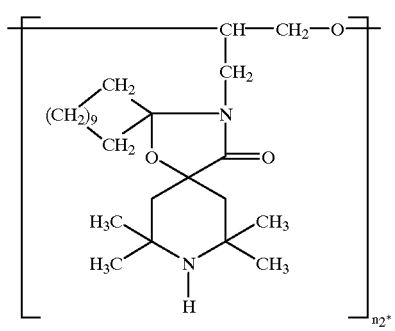

wherein $n_2$ and $n_2{}^*$ are a number from 2 to 20;

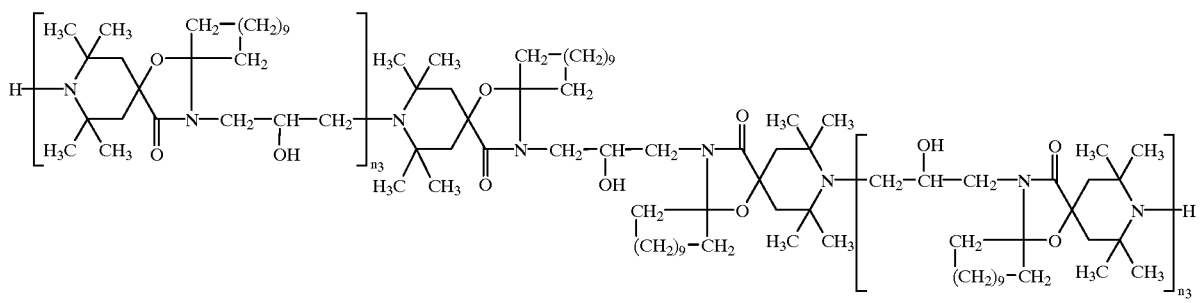
(B-9-a)

wherein the variables $n_3$ independently of one another are a number from 1 to 20;

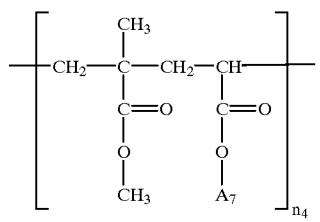
(B-10-a)

wherein $n_4$ is a number from 2 to 20, and
at least 50% of the radicals $A_7$ are a group of the formula (b-I):

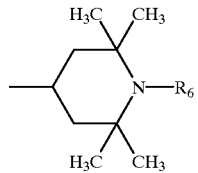
(b-I)

wherein $R_6$ is hydrogen, $C_1$–$C_8$alkyl, $O^-$, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl,
and the remaining radicals $A_7$ are ethyl.
According to a preferred embodiment,
the two different sterically hindered amine compounds of component (I) are
1) a compound of the formula (A-1-b) wherein $E_1$ is hydrogen, and a compound of the formula (B-1-a) wherein $R_6$ is hydrogen;
2) a compound of the formula (B-1-a) wherein $R_6$ is hydrogen, and a compound of the formula (B-7-a); or
3) a compound of the formula (B-2-a) wherein $R_{13}$ is methyl, and a compound of the formula (B-7-a).

The organic salt of zinc or magnesium defined in component (II) is preferably a compound of the formula $MeL_2$ in which Me is zinc or magnesium and L is an anion of an organic acid or of an enol. The organic acid can, for example, be a sulfonic acid, sulfinic acid, phosphonic acid or phosphinic acid, but is preferably a carboxylic acid. The acid can be aliphatic, aromatic, araliphatic or cycloaliphatic; it can be linear or branched; it can be substituted by hydroxyl or alkoxy groups; it can be saturated or unsaturated and it preferably contains 1 to 24 carbon atoms.

Examples of carboxylic acids of this type are formic, acetic, propionic, butyric, isobutyric, caprioic, 2-ethylcaproic, caprylic, capric, lauric, palmitic, stearic, behenic, oleic, lactic, ricinoleic, 2-ethoxypropionic, benzoic, salicylic, 4-butylbenzoic, toluic, 4-dodecylbenzoic, phenylacetic, naphthylacetic, cyclohexanecarboxylic, 4-butylcyclohexanecarboxylic or cyclohexylacetic acid. The carboxylic acid can also be a technical mixture of carboxylic acids, for example technical mixtures of fatty acids or mixtures of alkylated benzoic acids.

Examples of organic acids containing sulfur or phosphorus are methanesulfonic, ethanesulfonic, α,α-dimethylethanesulfonic, n-butanesulfonic, n-dodecanesulfonic, benzenesulfonic, toluenesulfonic, 4-nonylbenzenesulfonic, 4-dodecylbenzenesulfonic or cyclohexanesulfonic acid, dodecanesulfinic, benzenesulfinic or naphthalenesulfinic acid, butylphosphonic acid, phenylphosphonic acid, monomethyl or monoethyl phenylphosphonate, monobutyl benzylphosphonate, dibutylphosphinic acid or diphenylphosphinic acid.

If L is an enolate anion, it is preferably an anion of a β-dicarbonyl compound or of an o-acylphenol. Examples of β-dicarbonyl compounds are acetylacetone, benzoylacetone, dibenzoylmethane, ethyl acetoacetate, butyl acetoacetate, lauryl acetoacetate or α-acetylcyclohexanone. Examples of o-acylphenols are 2-acetylphenol, 2-butyroylphenol, 2-acetyl-1-naphthol, 2-benzoylphenol or salicylaldehyde. The enolate is preferably the anion of a β-dicarbonyl compound having 5 to 20 carbon atoms.

Organic salts of zinc or magnesium are preferably an acetylacetonate or an aliphatic monocarboxylate having, for example, 1 to 24 carbon atoms. Magnesium acetate, laurate and stearate, zinc formate, acetate, oenanthate, laurate and stearate as well as zinc acetylacetonate and magnesium acetylacetonate are some of the particular preferred examples.

Zinc stearate, magnesium stearate, zinc acetylacetonate, magnesium acetylacetonate, zinc acetate and magnesium acetate are of special interest.

The inorganic salt of zinc or magnesium is for example a carbonate containing compound such as Zn-hydroxide-carbonate, Mg-hydroxide-carbonate, dolomite, e.g a Ca/Mg carbonate such as Microdol Super (RTM) from Micro Minerals (RTM); or a natural or synthetic hydrotalcite.

The natural hydrotalcite is held to possess a structure $Mg_6Al_2(OH)_{16}CO_3 \cdot 4H_2O$. A typical empirical formula of a synthetic hydrotalcite is $$Al_2Mg_{4.35}OH_{11.36}CO_{3(1.67)} \cdot xH_2O.$$

Examples of the synthetic product include:

$$Mg_{0.7}Al_{0.3}(OH)_2(CO_3)_{0.15} \cdot 0.54H_2O,$$

$$Mg_{4.5}Al_2(OH)_{13}CO_3 \cdot 3.5H_2O, \text{ or}$$

$$Mg_{4.2}Al(OH)_{12.4}CO_3.$$

Preferred synthetic hydrotalcites are L-55R II (RTM) from REHEIS (RTM) as well as ZHT-4A (RTM) and DHT-4A (RTM) from Kyowa Chemical Industry Co (RTM).

Component (II) can also be a mixture of two different Mg- and/or Zn-compounds, for example Mg-stearate and hydrotalcite (DHT-4A (RTM)),
Zn-stearate and hydrotalcite (DHT-4A (RTM)),
Mg-acetylacetonate and hydrotalcite (DHT-4A (RTM)),
Mg-oxide and hydrotalcite (DHT-4A (RTM)),
Mg-hydroxide and hydrotalcite (DHT-4A (RTM)),
Zn-hydroxide-carbonate and Mg-stearate,
Zn-hydroxide-carbonate and Zn-stearate,
Zn-hydroxide-carbonate and Mg-acetylacetonate,
Zn-hydroxide-carbonate and Mg-oxide,
Zn-hydroxide-carbonate and Zn-oxide,
Zn-hydroxide-carbonate and Mg-hydroxide,
hydrotalcite (REHEIS (RTM)) and Mg-stearate,
hydrotalcite (REHEIS (RTM)) and Zn-stearate,
hydrotalcite (REHEIS (RTM)) and Mg-oxide,
dolomite (Microdol Super (RTM)) and Zn-stearate,
dolomite (Microdol Super (RTM)) and Mg-stearate,
dolomite (Microdol Super (RTM)) and Zn-oxide,
dolomite (Microdol Super (RTM)) and Mg-hydroxide,
Mg-stearate and Zn-stearate,
Mg-stearate and Zn-acetylacetonate,
Mg-stearate and Mg-oxide,
Mg-stearate and Zn-oxide,
Mg-stearate and Mg-hydroxide,
Zn-stearate and Mg-acetate,
Zn-stearate and Mg-oxide,
Zn-stearate and Mg-hydroxide,
Mg-acetylacetonate and Zn-acetylacetonate,
Mg-acetylacetonate and Mg-oxide,
Mg-acetylacetonate and Zn-oxide,
Mg-acetylacetonate and Mg-hydroxide,
Zn-acetylacetonate and Mg-oxide,
Zn-acetylacetonate and Zn-oxide, or
Mg-oxide and Zn-oxide.

In this case, the two different compounds of component (II) may be present in a weight ratio of 1:10 to 10:1.

A preferred embodiment of this invention relates to a stabilizer mixture wherein the compound(s) of component (II) is (are) selected from the group consisting of Mg carboxylates, Zn carboxylates, Mg oxides, Zn oxides, Mg hydroxides, Zn hydroxides, Mg carbonates and Zn carbonates.

Another preferred embodiment of this invention relates to a stabilizer mixture wherein component (II) is a Mg carboxylate, a Zn carboxylate, a hydrotalcite, or a mixture of a Mg carboxylate and a hydrotalcite.

A particularly preferred embodiment of this invention relates to a stabilizer mixture wherein component (II) is Mg stearate, Zn stearate, a hydrotalcite, in particular DHT-4A (RTM), or a mixture of Mg stearate and a hydrotalcite.

Preferred examples of stabilizer mixtures according to the present invention are:

1. TINUVIN 622 (RTM)+CHIMASSORB 944 (RTM)+Mg stearate
2. TINUVIN 622 (RTM)+CHIMASSORB 119 (RTM)+Mg stearate
3. TINUVIN 622 (RTM)+CHIMASSORB 2020 (RTM)+Mg stearate
4. TINUVIN 622 (RTM)+CYASORB UV 3346 (RTM)+Mg stearate
5. TINUVIN 622 (RTM)+CYASORB UV 3529 (RTM)+Mg stearate
6. TINUVIN 622 (RTM)+UVASORB HA 88 (RTM)+Mg stearate
7. TINUVIN 622 (RTM)+UVINUL 5050 H (RTM)+Mg stearate
8. TINUVIN 622 (RTM)+ADK STAB LA 63 (RTM)+Mg stearate
9. TINUVIN 622 (RTM)+ADK STAB LA 68 (RTM)+Mg stearate
10. TINUVIN 622 (RTM)+UVASIL 299 HM (RTM)+Mg stearate
11. TINUVIN 622 (RTM)+TINUVIN 770 (RTM)+Mg stearate
12. TINUVIN 622 (RTM)+TINUVIN 765 (RTM)+Mg stearate
13. TINUVIN 622 (RTM)+TINUVIN 123 (RTM)+Mg stearate
14. TINUVIN 622 (RTM)+HOSTAVIN N 20 (RTM)+Mg stearate
15. TINUVIN 622 (RTM)+ADK STAB LA 52 (RTM)+Mg stearate
16. TINUVIN 622 (RTM)+ADK STAB LA 57 (RTM)+Mg stearate
17. TINUVIN 622 (RTM)+CYASORB UV 3581 (RTM)+Mg stearate
18. TINUVIN 622 (RTM)+CYASORB UV 3641 (RTM)+Mg stearate
19. TINUVIN 622 (RTM)+UVINUL 4050 H (RTM)+Mg stearate
20. TINUVIN 622 (RTM)+DASTIB 845 (RTM)+Mg stearate
21. TINUVIN 770 (RTM)+CHIMASSORB 944 (RTM)+Mg stearate
22. TINUVIN 770 (RTM)+CHIMASSORB 119 (RTM)+Mg stearate
23. TINUVIN 770 (RTM)+CHIMASSORB 2020 (RTM)+Mg stearate
24. TINUVIN 770 (RTM)+CYASORB UV 3346 (RTM)+Mg stearate
25. TINUVIN 770 (RTM)+CYASORB UV 3529 (RTM)+Mg stearate
26. TINUVIN 770 (RTM)+UVASORB HA 88 (RTM)+Mg stearate
27. TINUVIN 770 (RTM)+UVINUL 5050 H (RTM)+Mg stearate 28. TINUVIN 770 (RTM)+ADK STAB LA 63 (RTM)+Mg stearate
29. TINUVIN 770 (RTM)+ADK STAB LA 68 (RTM)+Mg stearate
30. TINUVIN 770 (RTM)+UVASIL 299 HM (RTM)+Mg stearate
31. TINUVIN 770 (RTM)+TINUVIN 765 (RTM)+Mg stearate
32. TINUVIN 770 (RTM)+TINUVIN 123 (RTM)+Mg stearate
33. TINUVIN 770 (RTM)+HOSTAVIN N 20 (RTM)+Mg stearate
34. TINUVIN 770 (RTM)+ADK STAB LA 52 (RTM)+Mg stearate
35. TINUVIN 770 (RTM)+ADK STAB LA 57 (RTM)+Mg stearate
36. TINUVIN 770 (RTM)+CYASORB UV 3581 (RTM)+Mg stearate
37. TINUVIN 770 (RTM)+CYASORB UV 3641 (RTM)+Mg stearate
38. TINUVIN 770 (RTM)+UVINUL 4050 H (RTM)+Mg stearate
39. TINUVIN 770 (RTM)+DASTIB 845 (RTM)+Mg stearate
40. CHIMASSORB 944 (RTM)+CHIMASSORB 119 (RTM)+Mg stearate
41. CHIMASSORB 944 (RTM)+CHIMASSORB 2020 (RTM)+Mg stearate
42. CHIMASSORB 944 (RTM)+CYASORB UV 3346 (RTM)+Mg stearate
43. CHIMASSORB 944 (RTM)+CYASORB UV 3529 (RTM)+Mg stearate
44. CHIMASSORB 944 (RTM)+UVASORB HA 88 (RTM)+Mg stearate
45. CHIMASSORB 944 (RTM)+UVINUL 5050 H (RTM)+Mg stearate
46. CHIMASSORB 944 (RTM)+ADK STAB LA 63 (RTM)+Mg stearate
47. CHIMASSORB 944 (RTM)+ADK STAB LA 68 (RTM)+Mg stearate
48. CHIMASSORB 944 (RTM)+UVASIL 299 HM (RTM)+Mg stearate
49. CHIMASSORB 944 (RTM)+TINUVIN 765 (RTM)+Mg stearate
50. CHIMASSORB 944 (RTM)+TINUVIN 123 (RTM)+Mg stearate
51. CHIMASSORB 944 (RTM)+HOSTAVIN N 20 (RTM)+Mg stearate
52. CHIMASSORB 944 (RTM)+ADK STAB LA 52 (RTM)+Mg stearate
53. CHIMASSORB 944 (RTM)+ADK STAB LA 57 (RTM)+Mg stearate
54. CHIMASSORB 944 (RTM)+CYASORB UV 3581 (RTM)+Mg stearate
55. CHIMASSORB 944 (RTM)+CYASORB UV 3641 (RTM)+Mg stearate
56. CHIMASSORB 944 (RTM)+UVINUL 4050 H (RTM)+Mg stearate
57. CHIMASSORB 944 (RTM)+DASTIB 845 (RTM)+Mg stearate
58. CHIMASSORB 119 (RTM)+CYASORB UV 3529 (RTM)+Mg stearate
59. CHIMASSORB 11 9 (RTM)+ADK STAB LA 63 (RTM)+Mg stearate
60. CHIMASSORB 119 (RTM)+TINUVIN 765 (RTM)+Mg stearate
61. CHIMASSORB 119 (RTM)+TINUVIN 123 (RTM)+Mg stearate
62. CHIMASSORB 119 (RTM)+ADK STAB LA 52 (RTM)+Mg stearate
63. CHIMASSORB 11 9 (RTM)+CYASORB UV 3641 (RTM)+Mg stearate The formulations obtained by replacing in the formulations 2 to 63 Mg stearate by Zn stearate are also preferred. Further, the formulations 1 to 66 wherein Mg stearate is replaced by DHT-4A or Mg oxide or by combinations of the coadditives listed as component (II) are preferred.

Examples of the latter formulations are:
1. TINUVIN 622 (RTM)+CHIMASSORB 944 (RTM)+DHT-4A (RTM)+Mg stearate
2. TINUVIN 770 (RIM)+CHIMASSORB 944 (RIM)+DHT-4A (RIM)+Mg stearate
3. TINUVIN 622 (RTM)+CHIMASSORB 119 (RTM)+DHT-4A (RTM)+Mg stearate
4. TINUVIN 770 (RTM)+UVASORB HA 88 (RTM)+DHT-4A (RTM)+Mg stearate
5. TINUVIN 622 (RTM)+UVASORB HA 88 (RTM)+DHT-4A (RTM)+Mg stearate
6. TINUVIN 622 (RIM)+UVASIL 299 (RIM)+DHIAA (RIM)+Mg stearate
7. TINUVIN 622 (RTM)+CHIMASSORB 2020 (RTM)+DHT-4A (RTM)+Mg stearate
8. TINUVIN 770 (RTM)+CHIMASSORB 2020 (RIM)+DHT-4A (RIM)+Mg stearate The commercial product TINUVIN 622 (RTM) corresponds to the compound of the formula (B-7-a).

The commercial product CHIMASSORB 944 (RTM) corresponds to the compound of the formula (B-1-a) wherein $R_6$ is hydrogen.

The commercial product CHIMASSORB 119 (RTM) corresponds to the compound of the formula (B-2-a) wherein $R_{13}$ is methyl.

The commercial product CHIMASSORB 2020 (RTM) corresponds to the compound of the formula (B-1-b) wherein $R_6$ is hydrogen.

The commercial product CYASORB UV 3346 (RTM) corresponds to the compound of the formula (B-1-d) wherein $R_6$ is hydrogen.

The commercial product CYASORB UV 3529 (RTM) corresponds to the compound of the formula (B-1-d) wherein $R_6$ is methyl.

The commercial product UVASORB HA 88 (RTM) corresponds to the product (B-6-a) wherein $R_{32}$ is hydrogen.

The commercial product UVINUL 5050 H (RTM) corresponds to the compound of the formula (B-4-a) wherein $R_{18}$ is hydrogen.

The commercial product ADK STAB LA 63 (RTM) corresponds to the compound of the formula (B-5-a) wherein $R_{30}$ is methyl.

The commercial product ADK STAB LA 68 (RTM) corresponds to the compound of the formula (B-5-a) wherein $R_{30}$ is hydrogen.

The commercial product UVASIL 299 (RTM) corresponds to the compound of the formula (B-3-a) wherein $R_{16}$ is hydrogen.

The commercial product TINUVIN 770 (RTM) corresponds to the compound of the formula (A-1-b) wherein $E_1$ is hydrogen.

The commercial product TINUVIN 765 (RTM) corresponds to the compound of the formula (A-1-b) wherein $E_1$ is methyl.

The commercial product TINUVIN 123 (RTM) corresponds to the compound of the formula (A-1-b) wherein $E_1$ is octyloxy.

The commercial product HOSTAVIN N 20 (RTM) corresponds to the compound of the formula (A-3-a) wherein $E_{12}$ is hydrogen.

The commercial product ADK STAB LA 52 (RTM) corresponds to the compound of the formula (A-1-d) wherein $E_1$ is methyl.

The commercial product ADK STAB LA 57 (RTM) corresponds to the compound of the formula (A-1-d) wherein $E_1$ is hydrogen.

The commercial product CYASORB UV 3581 (RTM) corresponds to the compound of the formula (A-6-a) wherein $E_{18}$ is hydrogen.

The commercial product CYASORB UV 3641 (RTM) corresponds to the compound of the formula (A-6-a) wherein $E_{18}$ is methyl.

The commercial product UVINUL 4050 H (RTM) corresponds to the compound of the formula (A-10-a) wherein $E_{29}$ is hydrogen.

The commercial product DASTIB 845 (RTM) corresponds to the compound of the formula (A-1-a) wherein $E_1$ is hydrogen.

A further preferred embodiment of this invention relates to a stabilizer mixture containing additionally (X-1) a pigment or (X-2) an UV absorber or (X-3) a pigment and an UV absorber.

The pigment (component (X-1)) may be an inorganic or organic pigment.

Examples of inorganic pigments are titanium dioxide, zinc oxide, carbon black, cadmium sulfide, cadmium selenide, chromium oxide, iron oxide, lead oxide and so on.

Examples of organic pigments are azo pigments, anthraquinones, phthalocyanines, tetrachloroisoindolinones, quinacridones, isoindolines, perylenes, pyrrolopyrroles (such as Pigment Red 254) and so on.

All pigments described in "Gächter/Müller: Plastics Additives Handbook, 3rd Edition, Hanser Publishers, Munich Vienna New York", page 647 to 659, point 11.2.1.1 to 11.2.4.2 can be used as component (X-1).

A particularly preferred pigment is titanium dioxide, optionally in combination with an organic pigment.

Examples of such organic pigments are:

C.I. (Colour Index) Pigment Yellow 93, C.I. Pigment Yellow 95, C.I. Pigment Yellow 138, C.I. Pigment Yellow 139, C.I. Pigment Yellow 155, C.I. Pigment Yellow 162, C.I. Pigment Yellow 168, C.I. Pigment Yellow 180, C.I. Pigment Yellow 183, C.0. Pigment Red 44, C.I. Pigment Red 170, C.I. Pigment Red 202, C.I. Pigment Red 214, C.I. Pigment Red 254, C.I. Pigment Red 264, C.I. Pigment Red 272, C.I. Pigment Red 48:2, C.I. Pigment Red 48:3, C.I. Pigment Red 53:1, C.I. Pigment Red 57:1, C.I. Pigment Green 7, C.I. Pigment Blue 15:1, C.I. Pigment Blue 15:3 and C.I. Pigment Violet 19.

Examples of the UV absorber (component (X-2)) are a 2-(2'-hydroxyphenyl)benzotriazole, a 2-hydroxybenzophenone, an ester of substituted or unsubstituted benzoic acid, an acrylate, an oxamide, a 2-(2-hydroxyphenyl)-1,3,5-triazine, a monobenzoate of resorcinol or a formamidine.

The 2-(2'-hydroxyphenyl)benzotriazole is e.g. 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzo-triazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylmethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonyl-ethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol] or the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$-]$_2$ where R=3'-tert-butyl-4'-hydroxy-5'-2H-benzotriazole-2-ylphenyl.

2-(3',5'-Di-tert-butyl-2'-hydroxyphenyl)-5-chloro-benzotriazole, 2-(3'-tert-butyl-2'-hydroxy-5'-methylphenyl)-5-chloro-benzotriazole and 2-(3',5'-di-tert-amyl-2'-hydroxyphenyl)-benzotriazole are preferred.

The 2-hydroxybenzophenone is for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivatives.

2-Hydroxy-4-octyloxybenzophenone is preferred.

The ester of a substituted or unsubstituted benzoic acid is for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxy-benzoate or 2-methyl-4,6-di-tert-butylphenyl 3,5-di-tert-butyl-4-hydroxybenzoate.

2,4-Di-tert-butylphenyl 3,5-di-tert-butyl-4-hydroxybenzoate and hexadecyl 3,5-di-tert-butyl-4-hydroxybenzoate are preferred.

The acrylate is for example ethyl (α-cyano-β,β-diphenylacrylate, isooctyl α-cyano-β,β-di-phenylacrylate, methyl α-carbomethoxycinnamate, methyl (α-cyano-β-methyl-p-methoxy-cinnamate, butyl α-cyano-β-methyl-p-methoxy-cinnamate, methyl α-carbomethoxy-p-methoxycinnamate or N-(β-carbomethoxy-p-cyanovinyl)-2-methylindoline.

The oxamide is for example 4,4'-dioctyloxyoxanilide, 2,2'-diethoxyoxanilide, 2,2'-didodecyloxy-5,5'-di-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide or its mixture with 2-ethoxy-2'-ethyl-5,4'-di-tert-butoxanilide or mixtures of ortho- and para-methoxydisubstituted oxanilides or mixtures of o- and p-ethoxy-disubsituted oxanilides.

The 2-(2-hydroxyphenyl)-1,3,5-triazine is for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2--hydroxy-propoxy)phenyl]-1,3,5-triazine or 2-(2-hydroxyphenyl)-4-(4-methoxyphenyl)-6-phenyl-1,3,5-triazine.

2-(2-Hydroxy-4-octyloxyphenyl)-4,6-bis(2,4-dimethylphenyl)-1,3,5-triazine and 2-(2-hydroxy-4-hexyloxy)phenyl-4,6-diphenyl-1,3,5-triazine are preferred.

The monobenzoate of resorcinol is for example the compound of the formula:

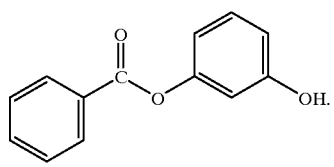

The formamidine is for example the compound of the formula:

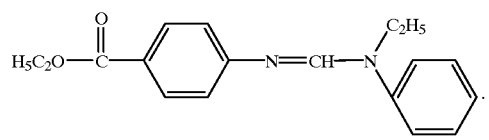

The UV absorber is in particular a 2-(2'-hydroxyphenyl) benzotriazole, a 2-hydroxybenzophenone or a hydroxyphenyltriazine.

A further preferred embodiment of this invention relates to a stabilizer mixture which additionally contains as a further component (XX) an organic salt of Ca, an inorganic salt of Ca, Ca oxide or Ca hydroxide.

Examples of an organic salt of Ca are Ca-stearate, Ca-laurate, Ca-lactate and Ca-stearoyl-lactate.

Examples of an inorganic salt of Ca are $CaCO_3$, $CaCl_2$, $CaF_2$, $Ca_3(PO_4)_2$, $CaHPO_4$, $Ca(PO_3)_2$, $Ca_2R_2O_7$, $CaSO_4$ and $CaSiO_3$.

Further preferred examples of stabilizer mixtures according to the present invention are:

a. TINUVIN 622 (RTM)+CHIMASSORB 944 (RTM)+Mg stearate+Ca stearate
b. TINUVIN 770 (RTM)+CHIMASSORB 944 (RTM)+Mg stearate+Ca stearate
c. TINUVIN 622 (RTM)+CHIMASSORB 119 (RTM)+Mg stearate+Ca stearate
d. TINUVIN 770 (RTM)+UVASORB HA 88 (RTM)+Mg stearate+Ca stearate
e. TINUVIN 622 (RTM)+UVASORB HA 88 (RTM)+Mg stearate+Ca stearate
f. TINUVIN 622 (RTM)+UVASIL 299 (RTM)+Mg stearate+Ca stearate
g. TINUVIN 622 (RTM)+CHIMASSORB 2020 (RTM)+Mg stearate+Ca stearate
h. TINUVIN 770 (RTM)+CHIMASSORB 2020 (RTM)+Mg stearate+Ca stearate
i. TINUVIN 622 (RTM)+CHIMASSORB 944 (RTM)+DHT-4A (RTM)+Ca stearate
j. TINUVIN 770 (RTM)+CHIMASSORB 944 (RTM)+DHT-4A (RTM)+Ca stearate
k. TINUVIN 622 (RTM)+CHIMASSORB 119 (RTM)+DHT-4A (RTM)+Ca stearate
i. TINUVIN 770 (RTM)+UVASORB HA 88 (RTM)+DHT-4A (RTM)+Ca stearate
m. TINUVIN 622 (RTM)+UVASORB HA 88 (RTM)+DHT-4A (RTM)+Ca stearate
n. TINUVIN 622 (RTM)+UVASIL 299 (RTM)+DHT-4A (RTM)+Ca stearate
o. TINUVIN 622 (RTM)+CHIMASSORB 2020 (RTM)+DHT-4A (RTM)+Ca stearate
p. TINUVIN 770 (RTM)+CHIMASSORB 2020 (RTM)+DHT-4A (RTM)+Ca stearate The stabilizer mixture according to this invention is suitable for stabilizing organic materials against degradation induced by light, heat or oxidation. Examples of such organic materials are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), or polyvinyl cyclohexane.

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(II) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or cc-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene such as styrene/butadienestyrene, styrene/isoprene/styrene, styrene/ethylene/butylene/styrene or styrene/ethylene/propylene/styrene.

7. Graft copolymers of styrene or oc-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene adn alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide of poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins. and melamine/fomaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

This invention therefore additionally relates to a composition comprising an organic material subject to degradation induced by light, heat or oxidation and the stabilizer mixture described above.

The compositions according to the present invention preferably do not contain a mineral oil.

Further, the organic material is preferably different from polyethylene, when component (I) is the combination of the compounds (B-1-a-1) and (B-7-a), in particular the combination of a compound of the class (β-1) and a compound of the class (β-7); and, at the same time, component (II) is Zn carboxylate, in particular an organic salt of Zn.

A preferred embodiment of the present invention relates to polypropylene containing a compound of the formula (B-1), a compound of the formula (B-7) and a Zn-carboxylate;

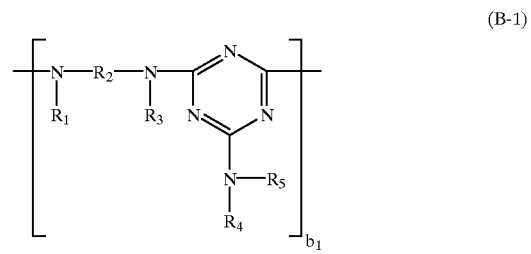

(B-1)

in which $R_1$, $R_3$, $R_4$ and $R_5$ independently of one another are hydrogen, $C_1$–$C_{12}$alkyl, $C_5$–$C_{12}$cycloalkyl, $C_1$–$C_4$-alkyl-substituted $C_5$–$C_{12}$cycloalkyl, phenyl, phenyl which is substituted by —OH and/or $C_1$–$C_{10}$alkyl; $C_7$–$C_9$phenylalkyl, $C_7$–$C_9$phenylalkyl which is substituted on the phenyl radical by —OH and/or $C_1$–$C_{10}$alkyl; or a group of the formula (b-I):

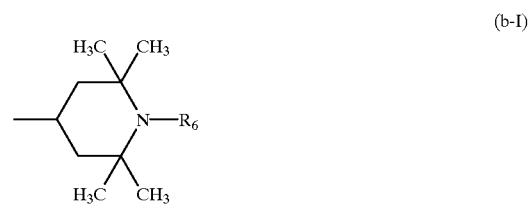

(b-I)

$R_2$ is $C_2$–$C_{18}$alkylene, $C_5$–$C_7$cycloalkylene or $C_1$–$C_4$alkylenedi($B_5$—$C_7$cycloalkylene), or the radicals $R_1$, $R_2$ and $R_3$, together with the nitrogen atoms to which they are bonded, perform a 5- to 10-membered heterocyclic ring, or $R_4$ and $R_5$, together with the nitrogen atom to which they are bonded, form a 5- to 10-membered heterocyclic ring, $R_6$ is hydrogen, $C_1$–$C_8$alkyl, O⁻, —OH, —CH$_2$CN, $C_1$–$C_{18}$alkoxy, $C_5$–$C_{12}$cycloalkoxy, $C_3$–$C_8$alkenyl, $C_7$–$C_9$phenylalkyl unsubstituted or substituted on the phenyl by 1, 2 or 3 $C_1$–$C_4$alkyl; or $C_1$–$C_8$acyl, and $b_1$ is a number from 2 to 50, with the proviso that at least one of the radicals $R_1$, $R_3$, $R_4$ and $R_5$ is a group of the formula (b-I);

(B-7)

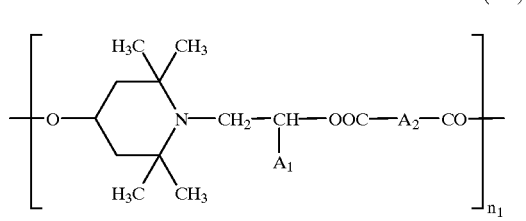

wherein $A_1$ is hydrogen or $C_1$–$C_4$alkyl,
$A_2$ is a direct bond or $C_1$–$C_{10}$alkylene, and
$n_1$ is a number from 2 to 50.

Another embodiment of the present invention is a method for stabilizing an organic material against degradation induced by light, heat or oxidation, which comprises incorporating into the organic material the stabilizer mixture described above.

The organic material is preferably a synthetic polymer, in particular from one of the above groups. Polyolefins are preferred and polyethylene, polypropylene, a polyethylene copolymer or a polypropylene copolymer are particularly preferred.

The components (I), (II) and optionally (X-1) and/or (X-2), as well as optionally component (XX) may be added to the organic material to be stabilized either individually or mixed with one another.

The total amount of the two different sterically hindered amine compounds (component (I)) in the organic material to be stabilized is preferably 0.005 to 5%, in particular 0.01 to 1% or 0.05 to 1%, relative to the weight of the organic material.

The Mg and/or Zn compounds (component (II)) are present in the organic material in a total amount of preferably 0.005 to 1%, in particular 0.05 to 0.2%, relative to the weight of the organic material.

The pigment (component (X-1)) is optionally present in the organic material in an amount of preferably 0.01 to 10%, in particular 0.05 to 1%, relative to the weight of the organic material.

The UV absorber (component (X-2)) is optionally present in the organic material in an amount of preferably 0.01 to 1%, in particular 0.05 to 0.5%, relative to the weight of the organic material.

The total amount of component (X-3) (the pigment in combination with the UV absorber) is preferably 0.01 to 10%, relative to the weight of the organic material. The weight ratio of the UV absorber to the pigment is for example 2:1 to 1:10.

When the pigment used is titanium dioxide in combination with an organic pigment as described above, titanium dioxide is preferably present in the organic material in an amount of 0.01 to 5%, relative to the weight of the organic material, and the organic pigment may be present in an amount of, for example, 0.01 to 2%, relative to the weight of the organic material.

The Ca compound (component (XX)) is optionally present in the organic material in an amount of e.g. 0.005 to 1%, preferably 0.05 to 0.2%.

The weight ratio of the two different sterically hindered amine compounds forming component (I) is for example 1:10 to 10:1, preferably 1:5 to 5:1, in particular 1:2 to 2:1.

The weight ratio of the components (I):(II) is for example 1:10 to 20:1, preferably 1:5 to 5:1, in particular 1:2 to 2:1.

The weight ratio of the components (I):(X-1) is for example 1:10 to 10:1, preferably 1:5 to 5:1, in particular 1:2 to 2:1.

The weight ratio of the components (I):(X-2) is for example 1:5 to 5:1, preferably 1:2 to 2:1.

The weight ratio of the components (I) (X-3) is for example 1:10 to 10:1, preferably 1:5 to 5:1, in particular 1:2 to 2:1.

The weight ratio of the components (I):(XX) is for example 1:10 to 10:1, preferably 1:5 to 5:1, in particular 1:2 to 2:1.

The above components can be incorporated into the organic material to be stabilized by known methods, for example before or during shaping or by applying the dissolved or dispersed compounds to the organic material, if necessary with subsequent evaporation of the solvent. The components can be added to the organic material in the form of a powder, granules or a masterbatch, which contains these components in, for example, a concentration of from 2.5 to 25% by weight.

If desired, the components (I), (II) and optionally (X-1) and/or (X-2), as well as component (XX) can be melt blended with each other before incorporation in the organic material. They can be added to a polymer before or during the polymerization or before the crosslinking.

The materials stabilized according to this invention can be used in a wide variety of forms, for example as films, fibres, tapes, moulding compositions, profiles or as binders for paints, adhesives or putties.

Examples of Processing or Transformation of the Plastics According to the Present Invention are:

Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), cast polymerization (R&M process, RAM extrusion), gel-coating, tape extrusion, GMT-process, SMC-process, plastisol, and dipping (PVC, latex).

The Plastics According to the Present Invention may be Used for the Preparation of:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, handy, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), BOPP, BOPET, bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play veh VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

The stabilized material may additionally also contain various conventional additives, for example:

1. Antioxidants 1.1. Alkylated monophenols, for example 2,6-di-tert-butyl-4-methylphenol, 2--tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dicyclopentyl-4-methylphenol, 2(α-methylcyclohexyl)-4-dimethylphenol, 2,6-dioctadecyl-4-methylphenol, 2,4,6-tricyclohexylphenyl, 2,6-di-tert-butyl-4-methoxymethylphenol, nonylphenols which are linear or branched in the side chains, for example, 2,6-di-nonyl-4-methyl-phenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4--methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E)

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenol) disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenyl), 2,2'-ethylenebis(6-di-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-di-tert-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylphenyl)-6-tert-butyl-4-methylphenyl]terephthalate, 1,1-bis-(3,5-dimethyl-2-hydroxy-phenyl)butane, 2,2-bis-(3,5-di-tert-butyl-4-hydroxyphenyl)propane, 2,2-bis-(5-tert--butyl-4-hydroxy2-methylphenyl)-4-n-dodecylmercaptobutane, 1,1,5,5-tetra-(5-tert--butyl-4-hydroxy2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterphthalate, bis(3,5-di-tert-butyl-4-hydroxybenzyl)sulfide, isooctyl-3,5di-tert-butyl-4--hydroxybenzylmercaptoacetate.

1.8. Hydroxybenzylated malonates, for example dioctadecyl-2,2-bis-(3,5-di-tert--butyl-2-hydroxybenzyl)-malonate, di-octadecyl-2-(3-tert-butyl-4-hydroxy-5--methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl--4-hydroxybenzyl)-2,4,6-trimethylbenzene, 1,4-bis-(3,5-di-tert-butyl-4-hydroxybenzyl)-2,3,5,6-trimethylbenzene, 2,4,6-tris-(3,5-di-tert-butyl-4-hydroxybenzyl)phenol.

1.10. Triazine Compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-tert-butyl-4-hydroxyphenylpropionyl-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzyl-phosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy3-methylbenzylphosphonate, the calcium salt of the monoethyl ester of 3,5-di-tert-butyl-4-hydroxybenzylphosphonic acid 1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl) isocyanurate, N,N'-bis(hydroxyethyl) oxamide, 3-thiaundecanol, 3-thiapentadecanol trimethylhexaneiol, timethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, timethylolopropane, 4-hydroxymethyl-1-phospha-2,6,7-trioxabicyclo[2.2.2] octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapnetadecanol, trimethylhexanediol, trimethylolpropane, 4-hydroxymethyl-1-phospha-2,6,7-trioxabicyclo[2.2.2]octane.

1.16. Esters of 3.5-di-tert-butyl-4-hydroxyphenyl acetic acid with mono- or polyhydric alcohols, e.g. with methanol, ethanol, octanol, octadecanol, 1,6-hexanediol, 1,9- nonanediol, ethylene glycol, 1,2-propanediol, neopentyl glycol, thiodiethylene glycol, diethylene glycol, triethylene glycol, pentaerythritol, tris-(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)hydrazine.

1.18. Ascorbic acid (vitamin C)

1.19. Aminic antioxidants, for example N,N'-di-isopropyl-p-phenylenediamine, N, N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert--octylphenyl)-1-naphthylamine, N-phenyl-2-naphthylamine, octylated di-phenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethyl-aminoethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino)propane, (o-tolyl)biguinide, Bis[4-(1',3'-dimethylbutyl)phenyl]amine, tert-octylated N-phenyl-1-naphthylamine, a mixture of mono- and dialkylated tert-butyl/tert-octyidiphenylamines, a mixture of mono- and dialkylated nonyldiphenylamines, a mixture of mono- and dialkylated dodecyidiphenylamines, a mixture of mono- and dialkylated isopropyl/isohexyidiphenylamines, a mixture of mono-und dialkylated tert-butyldiphenylamines, 2,3-di-hydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N, N',N'-tetraphenyl-1,4-diamino-but-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers

Nickel compounds, for example nickel complexes of 2,2'-thio-bis-[4-(1,1,3,3-tetra-methylbutyl)phenol], such as the 1:1 or 1:2 complex, with or withou additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

3. Metal deactivators, for example N,N'-diphenyloxamide, N-salicylal-N'-salicyloyl hydrazine, N, N'-bis(salicyloyl) hydrazine, N,N'-bis(3,5-di-tert-butyl-4-hydroxy-phenylpropionyl) hydrazine , 3-salicyloylamino-1, 2,4-triazole, bis(benzylidene)-oxalyl dihydrazide, oxanilide, isophthaloyl dihydrazide, sebacoyl bisphenyl-hydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol, diphosphite, tris(2,4-di-tert-butylphenyl) phosphite, diisodecyl pentaerythritol diphoshite, bis(2,4-di-tert-butylphenyl)-pentaerythritol diphoshite, diisodecyloxy-pentaerythritol diphosphite, bis(2,4-di-tert-butyl-6-methylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methyl-phenyl)methylphosphite, bis(2,4-di-tert-butyl-6-methyl-phenyl)ethylphosphite.

5. Hydroxylamines, for example, N,N-dibenzylhydroxylamine, N,N-diethylhydroxyl-amine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridecyl-nitrone, N-hexadecyl-alpha-pentadecyl-nitrone, N-octadecyl-alpha-heptadecyl-nitrone, N-hexadecyl-alpha-heptadecyl-nitrone, N-octadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyidithiocarbamate, dioctadecyl disulfide, pentaerythritol tetrakis(p-dodecylmercapto)propionate.

9. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or tin pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers ("ionomers").

11. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example, plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. Nos. 4,325,863, 4,338,244, 5,175,312, 5,216,052, 5,252,643, DE-A-4316611, DE-A-4316622, DE-A-4316876, EP-A-0589839 or EP-A-0591102 or 3--[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2--hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2--one, 3-(3,5-dimethyl-4-pivaloyloxyphenyl)-5,7-di-tert-butyl-benzofuran-2-one.

The weight ratio of the total amount of components (I), (II) and optionally (X-1) and/or (X-2), as well as optionally component (XX) to the total amount of the conventional additives can be, for example, 100:1 to 1:100.

The examples below illustrate the invention in greater detail. All percentages and parts are by weight, unless stated otherwise.

Stabilizers Used in the Following Examples I to IV:

(For the polymeric compounds, the mean degree of polymerization is indicated in each case.)

Compound (B-1-a-1):

(CHIMASSORB 944 (RTM))

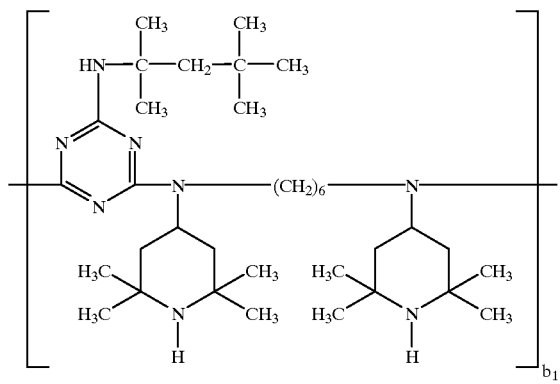

with $b_1$ being 4.5.

Compound (B-2-a-1):

(CHIMASSORB 119 (RTM))

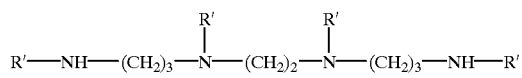

where R' is

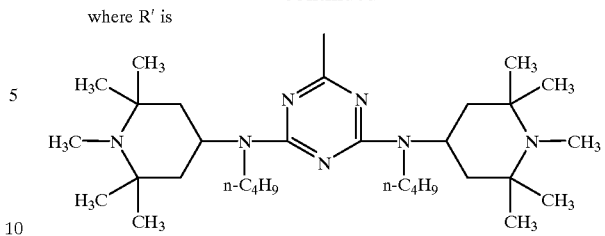

Compound (B-7-a-1):

(TINUVIN 622 (RTM))

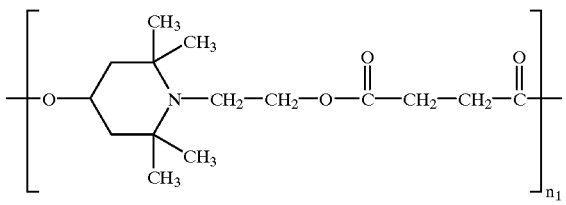

with $n_1$ being 5.1.

Compound (X-2-a):

TINUVIN 327 (RTM)

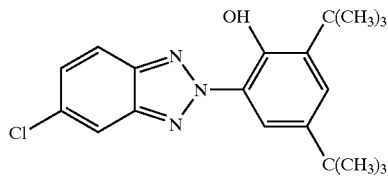

Example I

Light Stabilization of Polypropylene Tapes.

100 parts of polypropylene powder (melt flow index: 3.2 g/10 min at 230° C. and 2160 g) are blended in a barrel mixer with 0.05 parts of pentaerythrityl tetrakis[3-(3,5-di-tert-butyl-4-hydroxyphenyl)propionate], 0.005 parts of tris[2,4-di-tert-butylphenyl]phosphite and the stabilizer system indicated in Table 1. Then, the blend is compounded in an extruder at temperatures of 180°–220° C. The granules obtained on extrusion and granulation are transformed into films at 220°–260° C. in a second extruder equipped with a flat sheet die. The films are cut into ribbons which are drawn to achieve a stretch ratio of 1:6. The tapes obtained with this procedure are finally 50 Em thick and 2.5 mm wide.

The tapes are mounted without tension on sample holders and exposed to natural weathering in Florida (450 South, direct, approximately 145 kLy/year). Periodically, the tensile strength of the exposed tapes is measured. The received energy (in kLy) corresponding to a loss of 50% ($E_{50}$) of the initial tensile strength or the % retained tensile strength after 320 kLy is a measure for the stabilizing efficiency of the stabilizer system.

The values obtained are summarized in Table 1.

TABLE 1

| Stabilizer System | $E_{50}$ (kLy) to 50% retained tensile strength or % retained tensile strength after 320 kLy |
|---|---|
| 0.1% of Mg stearate | 58 |
| 0.05% of (B-1-a-1) + 0.05% of (B-7-a-1) + 0.1% of Mg stearate | 78% |

Example II
Light Stabilization of Polypropylene Homopolymer Films.

100 parts of unstabilized polypropylene powder (melt flow index: 3.8 g/10 min at 230° C. and 2160 g) are homogenized at 200° C. for 10 min in a Brabender plastograph with 0.05 parts of pentaerythrityl-tetrakis{3-(3,5-di-tert-butyl-4-hydroxyphenyl)propionate}, 0.10 parts of tris{2,4-di-tert-butylphenyl}phosphite and the stabilizer system indicated in Tables 2a, 2b, 2c and 2d. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 in hours ($T_{0.1}$) is a measure for the efficiency of the stabilizer system. The values obtained are summarized in Tables 2a, 2b, 2c and 2d.

TABLE 2a

| Stabilizer system | $T_{0.1}$ in hours to 0.1 carbonyl absorbance |
|---|---|
| 0.1% of Mg stearate + 0.1% of (X-2-a) | 360 |
| 0.025% of (B-1-a-1) + 0.025% of (B-7-a-1) + 0.1% of Mg stearate + 0.1% of (X-2-a) | 1960 |
| 0.025% of (B-2-a-1) + 0.025% of (B-7-a-1) + 0.1% of Mg stearate + 0.1% of (X-2-a) | 1820 |

TABLE 2b

| Stabilizer system | $T_{0.1}$ in hours to 0.1 carbonyl absorbance |
|---|---|
| 0.1% of Zn stearate + 0.5% of $TiO_2$ (rutile) | 430 |
| 0.025% of (B-1-a-1) + 0.025% of (B-7-a-1) + 0.1% of Zn stearate + 0.5% of $TiO_2$ (rutile) | 1540 |
| 0.025% of (B-2-a-1) + 0.025% of (B-7-a-1) + 0.1% of Zn stearate + 0.5% of $TiO_2$ (rutile) | 1840 |

TABLE 2c

| Stabilizer system | $T_{0.1}$ in hours to 0.1 carbonyl absorbance |
|---|---|
| 0.025% of (B-1-a-1) + 0.025% of (B-7-a-1) + 0.1% of hydrotalcite (DHT-4A (RTM)) + 0.5% of $TiO_2$ (rutile) | 2020 |

TABLE 2d

| Stabilizer system | $T_{0.1}$ in hours to 0.1 carbonyl absorbance |
|---|---|
| 0.025% of (B-1-a-1) + 0.025% of (B-7-a-1) + 0.1% of hydrotalcite (DHT-4A (RTM)) + 0.1% of (X-2-a) | 2320 |

Example III
Light Stabilization of Polypropylene Copolymer Films.

100 parts of unstabilized copolypropylene powder (melt flow index: 6 g/10 min at 230° C. and 2160 g; 10% ethylene monomer) are homogenized at 200° C. for 10 min in a Brabender plastograph with 0.05 parts of pentaerythrityl-tetrakis{3-(3,5-di-tert-butyl-4-hydroxyphenyl)propionate}, 0.10 parts of tris{2,4-di-tert-butylphenyl} phosphite and the stabilizer system indicated in Table 3. The material thus obtained is compression molded in a laboratory press between two aluminum foils for 6 min at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer system. The values obtained are summarized in Table 3.

TABLE 3

| Stabilizer system | $T_{0.1}$ in hours to 0.1 carbonyl absorbance |
|---|---|
| 0.1% of hydrotalcite (DHT-4A (RTM)) + 0.5% of $TiO_2$ (rutile) | 390 |
| 0.05% of (B-1-a-1) + 0.05% of (B-7-a-1) + 0.1% of hydrotalcite (DHT-4A (RTM)) + 0.5% of $TiO_2$ (rutile) | 4000 |
| 0.05% of (B-2-a-1) + 0.05% of (B-7-a-1) + 0.1% of hydrotalcite (DHT-4A (RTM)) + 0.5% of $TiO_2$ (rutile) | 4960 |

Example IV
Light Stabilization of Polyethylene HD Films.

100 parts of unstabilized high density polyethylene powder (density: 0.964 g cm$^{-3}$, melt flow index: 5.0 g/10 min at 190° C. and 2160 g) are homogenized at 180° C. for 10 min in a Brabender plastograph with 0.03 parts of octadecyl 3-(3,5-di-tert-butyl-4-hydroxyphenyl)-propionate and the stabilizer system indicated in Tables 4a, 4b, 4c, 4d, 4e, 4f, 4g, 4h and 4i.

The material thus obtained is compression molded in a laboratory press between two aluminum foils for 6 min at 210° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without water-spraying).

Periodically, these samples are removed from the exposure apparatus and their carbonyl content is measured with an infrared spectrophotometer. The exposure time corresponding to formation of a carbonyl absorbance of 0.1 is a measure for the efficiency of the stabilizer mixture. The values obtained are summarized in Table 4a, 4b, 4c, 4d, 4e, 4f, 4g, 4h and 4i.

TABLE 4a

| Stabilizer system | $T_{0.1}$ in hours to 0.1 carbonyl absorbance |
|---|---|
| 0.025% of (B-1-a-1) + 0.025% of (B-7-a-1) + 0.1% of Mg stearate | 18060 |

TABLE 4b

| Stabilizer system | $T_{0.1}$ in hours to 0.1 carbonyl absorbance |
|---|---|
| 0.025% of (B-1-a-1) + 0.025% of (B-7-a-1) + 0.1% of hydrotalcite (DHT-4A (RTM)) | 18055 |

TABLE 4c

| Stabilizer system | $T_{0.1}$ in hours to 0.1 carbonyl absorbance |
|---|---|
| 0.025% of (B-1-a-1) + 0.025% of (B-7-a-1) + 0.05% of Mg stearate + 0.05% of Ca stearate | 22210 |

TABLE 4d

| Stabilizer system | $T_{0.1}$ in hours to 0.1 carbonyl absorbance |
|---|---|
| 0.025% of (B-1-a-1) + 0.025% of (B-7-a-1) + 0.05% of hydrotalcite (DHT-4A (RTM)) + 0.1% of Ca stearate | 15680 |

TABLE 4e

| Stabilizer system | $T_{0.1}$ in hours to 0.1 carbonyl absorbance |
|---|---|
| 0.025% of (B-1-a-1) + 0.025% of (B-7-a-1) + 0.05% of hydrotalcite (DHT-4A (RTM)) + 0.1% of Mg stearate | 23040 |

TABLE 4f

| Stabilizer system | $T_{0.1}$ in hours to 0.1 carbonyl absorbance |
|---|---|
| 0.025% of (B-1-a-1) + 0.025% of (B-7-a-1) + 0.1% of Mg stearate + 0.5% of TiO$_2$ (rutile) | >28700 |

TABLE 4g

| Stabilizer system | $T_{0.1}$ in hours to 0.1 carbonyl absorbance |
|---|---|
| 0.025% of (B-1-a-1) + 0.025% of (B-7-a-1) + 0.05% of Mg stearate + 0.5% of TiO$_2$ (rutile) + 0.05% of Ca stearate | >28700 |

TABLE 4h

| Stabilizer system | $T_{0.1}$ in hours to 0.1 carbonyl absorbance |
|---|---|
| 0.025% of (B-1-a-1) + 0.025% of (B-7-a-1) + 0.05% of hydrotalcite (DHT-4A (RTM)) + 0.5% of TiO$_2$ (rutile) + 0.05% of Ca stearate | >28700 |

TABLE 4i

| Stabilizer system | $T_{0.1}$ in hours to 0.1 carbonyl absorbance |
|---|---|
| 0.025% of (B-1-a-1) + 0.025% of (B-7-a-1) + 0.05% of hydrotalcite (DHT-4A (RTM)) + 0.5% of TiO$_2$ (rutile) + 0.05% of Mg stearate | >28700 |

What is claimed is:

1. A stabilizer mixture containing (I) two different sterically hindered amine compounds selected from the group consisting of the classes, (β-1) a compound of the formula (B-1):

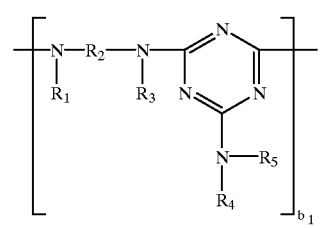

in which

R$_1$, R$_3$, R$_4$ and R$_5$ independently of one another are hydrogen, C$_1$–C$_{12}$alkyl, C$_5$–C$_{12}$cycloalkyl, C$_1$–C$_4$-alkyl-substituted C$_5$–C$_{12}$cycloalkyl, phenyl, phenyl which is substituted by —OH and/or C$_1$–C$_{10}$alkyl; C$_7$–C$_9$phenylalkyl, C$_7$–C$_9$phenylalkyl which is substituted on the phenyl radical by —OH and/or C$_1$–C$_{10}$alkyl; or a group of the formula (b-I):

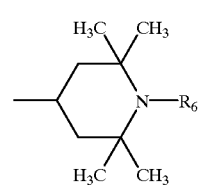

R$_2$ is C$_2$–C$_{18}$alkylene, C$_5$–C$_7$cycloalkylene or C$_1$–C$_4$alkylenedi(B5–C$_7$cycloalkylene), or the radicals R$_1$, R$_2$ and R$_3$, together with the nitrogen atoms to which they are bonded, perform a 5- to 10-membered heterocyclic ring, or R$_4$ and R$_5$, together with the nitrogen atom to which they are bonded, form a 5- to 10-membered heterocyclic ring, R$_6$ is hydrogen, C$_1$–C$_8$alkyl, O, —OH, —CH$_2$CN, C$_1$–C$_{18}$alkoxy, C$_5$–C$_{12}$cycloalkoxy, C$_3$–C$_6$alkenyl, C$_7$–C$_9$phenylalkyl unsubstituted or substituted on the phenyl by 1, 2 or 3 C$_1$–C$_4$alkyl; or C$_1$–C$_8$acyl, and b$_1$ is a number from 2 to 50, with the proviso that at least one of the radicals R$_1$, R$_3$, R$_4$ and R$_5$ is a group of the formula (b-I):

(β-2) a compound of the formula (B-2):

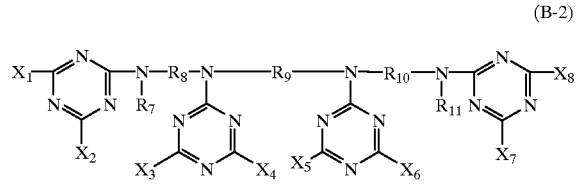

wherein

R$_7$ and R$_{11}$ independently of one another are hydrogen or C$_1$–C$_{12}$alkyl, R$_8$, R$_9$ and R$_{10}$ independently of one another are C$_2$–C$_{10}$alkylene, and X$_1$, X$_2$, X$_3$, X$_4$, X$_5$, X$_6$, X$_7$ and X$_8$ independently of one another are a group of the formula (b-II):

(b-II)

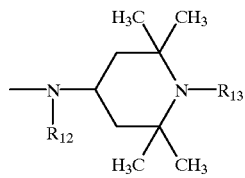

in which R$_{12}$ is hydrogen, C$_1$–C$_{12}$alkyl, C$_5$–C$_{12}$cycloalkyl, C$_1$–C$_4$alkyl-substituted C$_5$–C$_{12}$cycloalkyl, phenyl, —OH— and/or C$_1$–C$_{10}$alkyl-substituted phenyl, C$_7$–C$_9$phenylalkyl, C$_7$–C$_9$phenylalkyl which is substituted on the phenyl radical by —OH and/or C$_1$–C$_{10}$alkyl; or a group of the formula (b-I) as defined above, and R$_{13}$ has one of the meanings of R$_6$;

(β-6) a product (B-6) obtainable by reacting a product, obtained by reaction of a polyamine of the formula (B-6-1) with cyanuric chloride, with a compound of the formula (B-6-2):

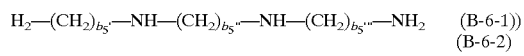
(B-6-1)
(B-6-2)

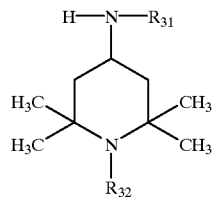

in which b$_5'$, b$_5''$ and b$_5'''$ independently of one another are a number from 2 to 12, R$_{31}$ is hydrogen, C$_1$–C$_{12}$alkyl, C$_5$–C$_{12}$cycloalkyl, phenyl or C$_7$–C$_9$phenylalkyl, and R$_{32}$ has one of the meanings of R$_6$;

(β-7) a compound of the formula (B-7):

(B-7)

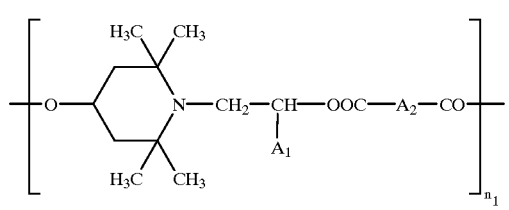

wherein A$_1$ is hydrogen or C$_1$–C$_4$alkyl,

A$_2$ is a direct bond or C$_1$–C$_{10}$alkylene, and n$_1$ is a number from 2 to 50; and (β-8) at least one compound of the formulae (B-8-a) or (B-8-b):

(B-8-a)

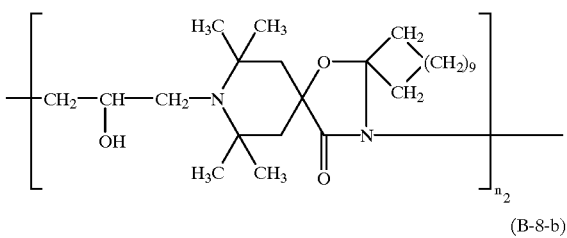

(B-8-b)

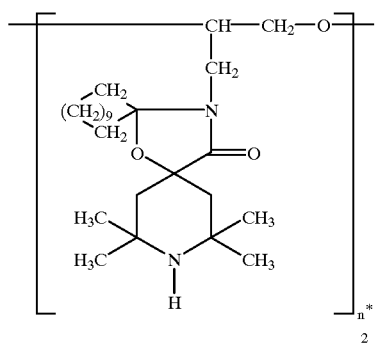

wherein n$_2$ and n$_2$* are a number from 2 to 50; and (II) at least one compound selected from the group consisting of an organic salt of Zn, an inorganic salt of Zn, Zn oxide, Zn hydroxide, an organic salt of Mg, an inorganic salt of Mg, Mg oxide and Mg hydroxide;

with the proviso that component (I) is different from the combination of the compounds (B-8-a) and (B-8-b):

(B-8-a)

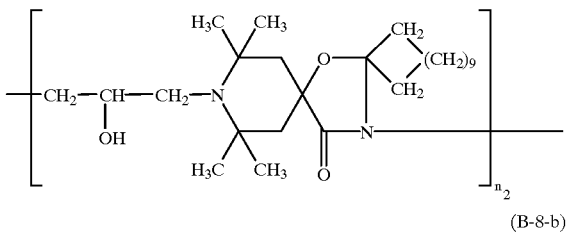

(B-8-b)

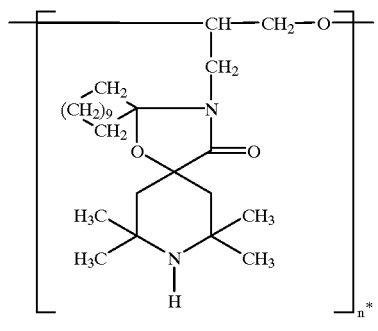

wherein n$_2$ and n$_2$* are a number from 2 to 50; and with the proviso that, when component (I) is the combination of the compounds (B-1-a-1) and (B-7-a):

(B-1-a-1)

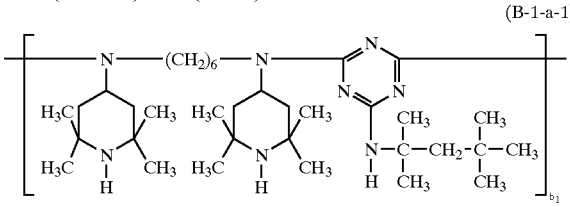

wherein $b_1$ is a number from 2 to 50, (B-7-a)
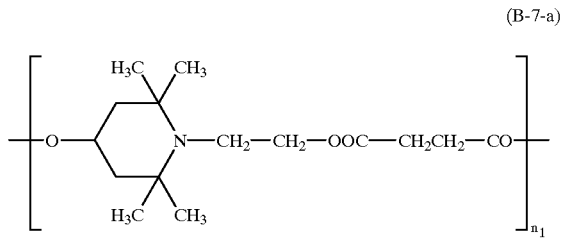

wherein $n_1$ is a number from 2 to 50; and, at the same time, component (II) is a Zn carboxylate;

the stabilizer mixture additionally contains as a further component (X-1) a pigment or (X-2) an UV absorber or (X-3) a pigment and an UV absorber.

2. A stabilizer mixture according to claim 1, wherein the product (B-6) is represented by a compound of the formula (B-6-α), (B-6-β) or (B-6-γ), or a mixture thereof:

(B-6-α)
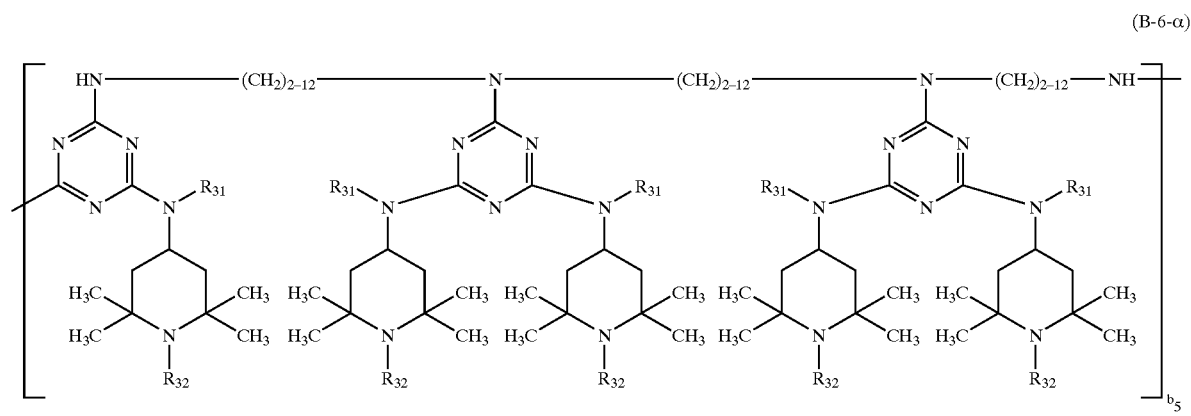

(B-6-β)
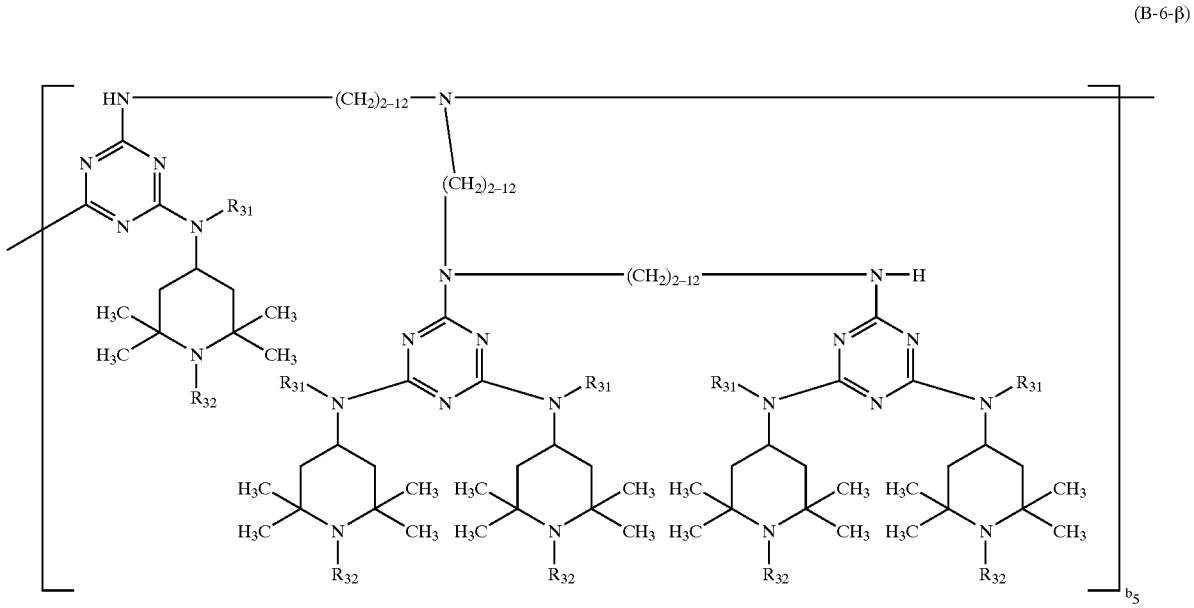

(B-6-γ)

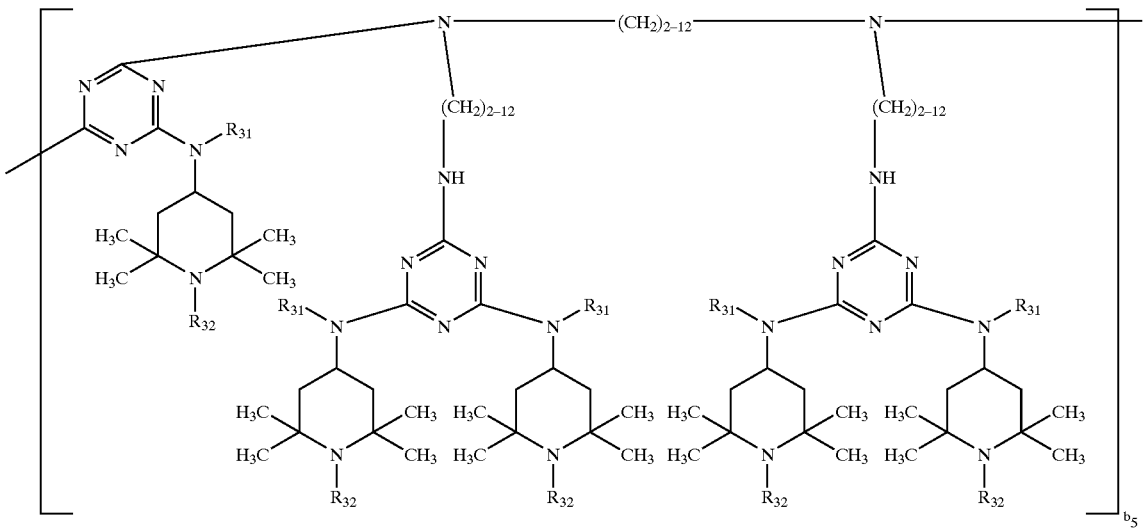

wherein $R_{31}$ and $R_{32}$ are as defined in claim 1 and $b_5$ is a number from 2 to 20.

3. A stabilizer mixture according to claim 1 wherein the class (β-6) relates to a compound of the formula:

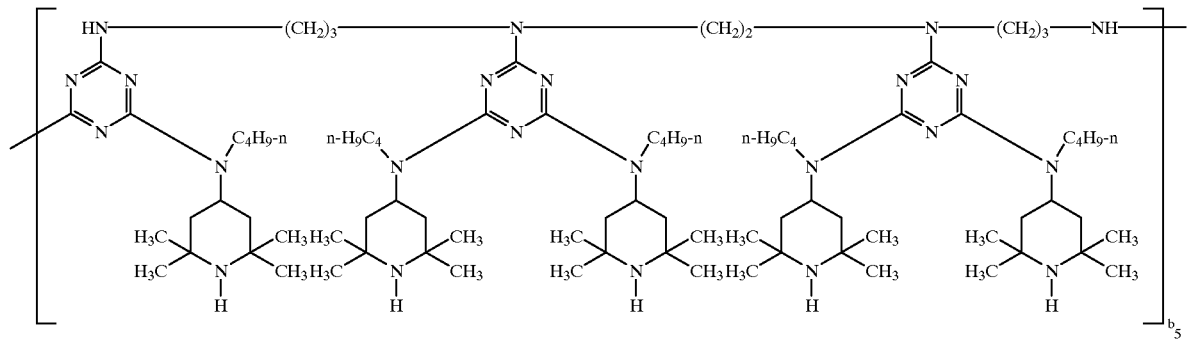

with $b_5$ being a number from 2 to 20.

4. A stabilizer mixture according to claim 1, wherein one of the two different sterically hindered amine compounds of component (I) is selected from the class (β-1).

5. A stabilizer mixture according to claim 1, wherein one of the two different sterically hindered amine compounds of component (I) is selected from the class (β-1), and the other of the two different sterically hindered amine compounds of component (I) is selected from the class (β-7).

6. A stabilizer mixture according to claim 1, wherein one of the two different sterically hindered amine compounds of component (I) is selected from the class (β-7), and the other of the two different sterically hindered amine compounds of component (I) is selected from the class (β-2).

7. A stabilizer mixture according to claim 1, wherein the two different sterically hindered amine compounds of component (I) are selected from different classes.

8. A stabilizer mixture according to claim 1, wherein:
$R_1$ and $R_3$ independently of one another are a group of the formula (b-I),
$R_2$ is $C_2-C_8$alkylene,
$R_4$ and $R_5$ independently of one another are hydrogen, $C_1-C_{12}$alkyl, $C_5-C_8$cycloalkyl or a group of the formula (b-I), or the radicals $R_4$ and $R_5$, together with the nitrogen atom to which they are bonded, form a 5- to 10-membered heterocyclic ring, and
$b_1$ is a number from 2 to 25;
$R_7$ and $R_{11}$ independently of one another are hydrogen or $C_1-C_{4alkyl}$;
$R_8$, $R_9$ and $R_{10}$ independently of one another are $C_2-C_4$alkylene, and
$X_1$, $X_2$, $X_3$, $X_4$, $X_5$, $X_6$, $X_7$ and $X_8$ independently of one another are a group of the formula (b-II),
$R_{12}$ is hydrogen, $C_1-C_4$alkyl, $C_5-C_8$cycloalkyl or a group of the formula (b-I);
$b_5'$, $b_5''$ and $b_5'''$ independently of one another are a number from 2 to 4, and
$R_{31}$ is hydrogen, $C_1-C_4$alkyl, $C_5-C_8$cycloalkyl, phenyl or benzyl;
$A_1$ is hydrogen or methyl,
$A_2$ is a direct bond or $C_2-C_6$alkylene, and
$n_1$ is a number from 2 to 25;
$n_2$ and $n_2*$ are a number from 2 to 25.

9. A stabilizer mixture according to claim 1, wherein the two different sterically hindered amine compounds of component (I) are selected from the group consisting of the compounds of the formulae (B-1-a), (B-1-b), (B-1-c), (B-1-d) and (B-2-a), a product (B-6-a) and the compounds of the formulae (B-7-a), (B-8-a) and (B-8-b):

wherein $b_1$ is a number from 2 to 20 and $R_6$ is hydrogen, $C_1$–$C_8$alkyl, O, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl;

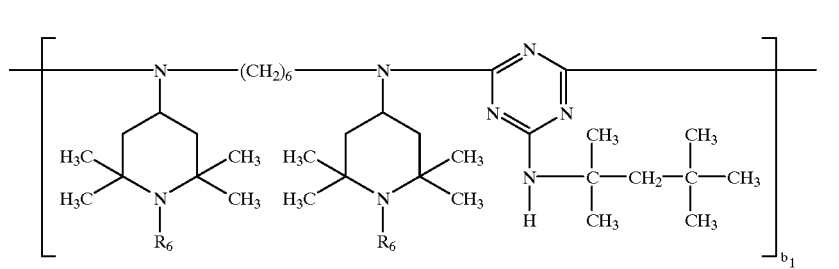

(B-1-a)

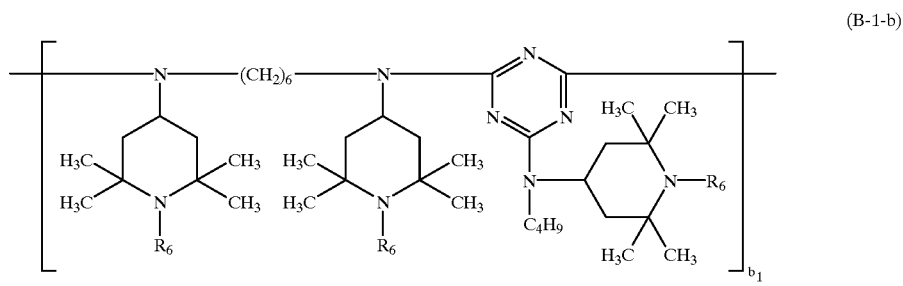

(B-1-b)

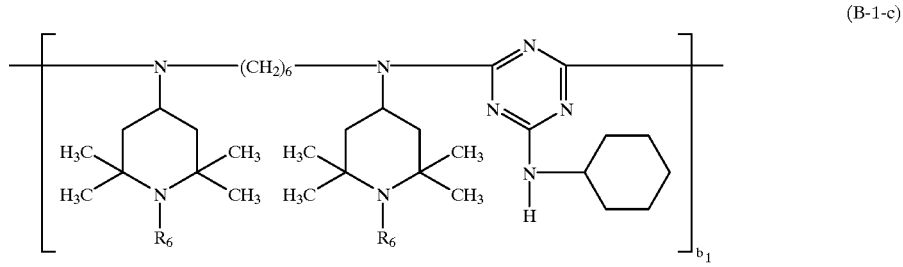

(B-1-c)

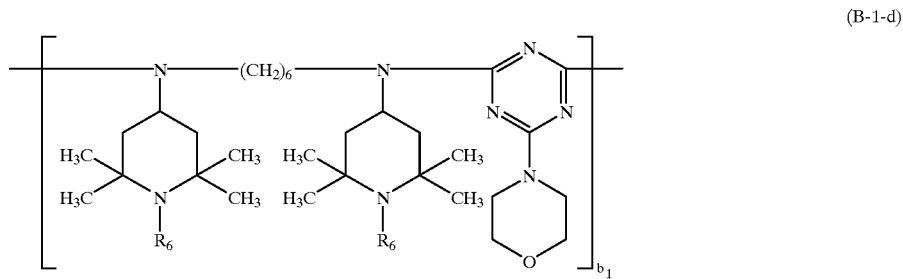

(B-1-d)

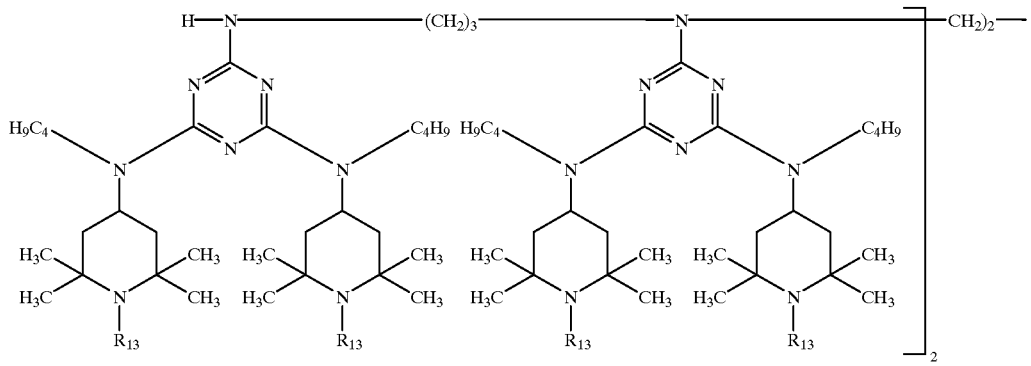
(B-2-a)

wherein $R_{13}$ has one of the meanings of $R_6$, a product (B-6-a) obtainable by reacting a product, obtained by reaction of a polyamine of the formula (B-6-1-a) with cyanuric chloride, with a compound of the formula (B-6-2-a):

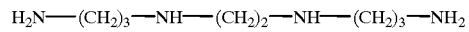
(B-6-1-a)

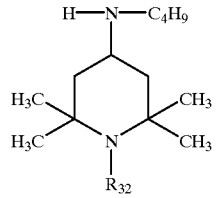
(B-6-2-a)

in which $R_{32}$ has one of the meanings of $R_6$;

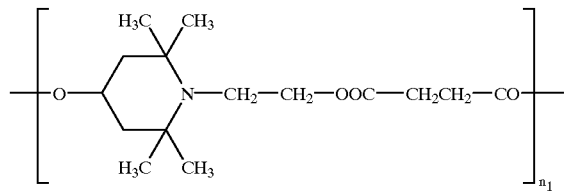
(B-7-a)

wherein $n_1$ is a number from 2 to 20

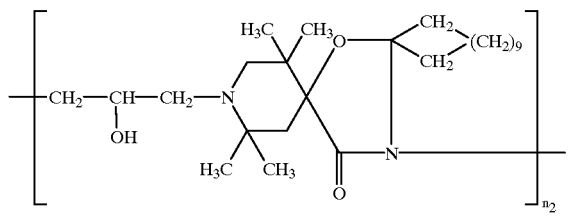
(B-8-a)

-continued

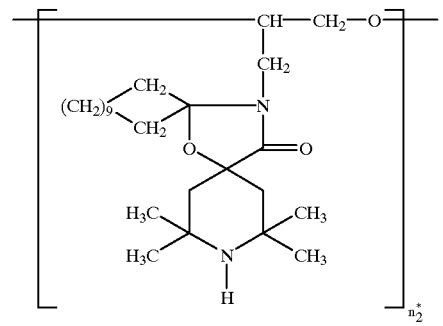
(B-8-b)

wherein $n_2$ and $n_2^*$ are a number from 2 to 20.

10. A stabilizer mixture according to claim 9 wherein the two different sterically hindered amine compounds of component (I) are
1) a compound of the formula (B-1-a) wherein $R_6$ is hydrogen, and a compound of the formula (B-7-a); or
2) a compound of the formula (B-2-a) wherein $R_{13}$ is methyl, and a compound of the formula (B-7-a).

11. A stabilizer mixture according to claim 1 wherein $R_6$, $R_{13}$ and $R_{32}$ are hydrogen, $C_1$–$C_4$alkyl, $C_1$–$C_{10}$alkoxy, cyclohexyloxy, allyl, benzyl or acetyl.

12. A stabilizer mixture according to claim 9 wherein $R_6$, $R_{13}$ and $R_{32}$ are hydrogen or methyl and $R_6$ additionally is $C_1$–$C_8$alkoxy.

13. A stabilizer mixture according to claim 1, wherein the compound of component (II) is selected from the group consisting of Mg carboxylates, Zn carboxylates, Mg oxides, Zn oxides, Mg hydroxides, Zn hydroxides, Mg carbonates and Zn carbonates.

14. A stabilizer mixture according to claim 1, which additionally contains as a further component
(X-1) a pigment or
(X-2) an UV absorber or
(X-3) a pigment and an UV absorber.

15. A stabilizer mixture according to claim 1, which additionally contains as a further component
(XX) an organic salt of Ca, an inorganic salt of Ca, Ca oxide or Ca hydroxide.

16. A composition comprising an organic material subject to degradation induced by light, heat or oxidation and a stabilizer mixture according to claim 1.

17. A composition according to claim 16 wherein the organic material is a synthetic polymer.

18. A composition according to claim 16 wherein the organic material is a polyolefin.

19. A composition according to claim 16 wherein the organic material is polyethylene, polypropylene, a polyethylene copolymer or a polypropylene copolymer.

20. Polypropylene containing a compound of the formula (B-1), a compound of the formula (B-7) and a Zn-carboxylate:

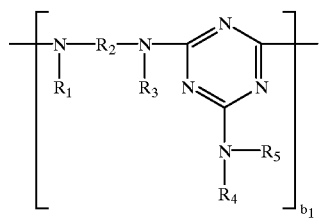

(B-1)

in which $R_1$, $R_3$, $R_4$ and $R_5$ independently of one another are hydrogen, $C_1$–$C_{12}$alkyl, $C_5$–$C_{12}$cycloalkyl, $C_1$–$C_4$-alkyl-substituted $C_5$–$C_{12}$cycloalkyl, phenyl, phenyl which is substituted by —OH and/or $C_1$–$C_{10}$alkyl; $C_7$–$C_9$phenylalkyl, $C_7$–$C_9$phenylalkyl which is substituted on the phenyl radical by —OH and/or $C_1$–$C_{10}$alkyl; or a group of the formula (b-I):

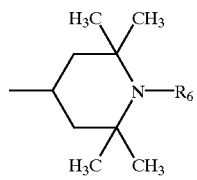

(b-I)

$R_2$ is $C_2$–$C_{18}$alkylene, $C_5$–$C_7$cycloalkylene or $C_1$–$C_4$alkylenedi($B_5$—$C_7$cycloalkylene), or the radicals $R_1$, $R_2$ and $R_3$, together with the nitrogen atoms to which they are bonded, perform a 5- to 10-membered heterocyclic ring, or $R_4$ and $R_5$, together with the nitrogen atom to which they are bonded, form a 5- to 10-membered heterocyclic ring, $R_6$ is hydrogen, $C_1$–$C_8$alkyl, O, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, and $b_1$ is a number from 2 to 50, with the proviso that at least one of the radicals $R_1$, $R_3$, $R_4$ and $R_5$ is a group of the formula (b-I):

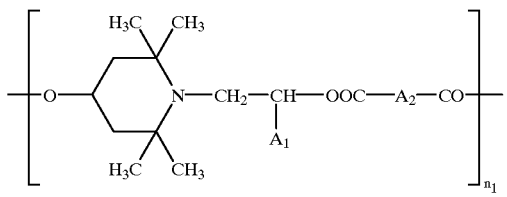

(B-7)

wherein $A_1$ is hydrogen or $C_1$–$C_4$alkyl, $A_2$ is a direct bond or $C_1$–$C_{10}$alkylene, and $n_1$ is a number from 2 to 50.

21. A method for stabilizing an organic material against degradation induced by light, heat or oxidation, which comprises incorporating into the organic material a stabilizer mixture according to claim 1.

* * * * *